United States Patent
Nakashima

(10) Patent No.: US 7,602,624 B2
(45) Date of Patent: Oct. 13, 2009

(54) CURRENT RESONANCE TYPE MULTI-PHASE DC/DC CONVERTING APPARATUS HAVING A LARGE CAPACITY WITHOUT RESTRICTING MULTI-PHASE

(75) Inventor: Heisuke Nakashima, Tokyo (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 453 days.

(21) Appl. No.: 11/413,559

(22) Filed: Apr. 28, 2006

(65) Prior Publication Data

US 2006/0291260 A1 Dec. 28, 2006

(30) Foreign Application Priority Data

Jun. 27, 2005 (JP) .............................. 2005-186569

(51) Int. Cl.
*H02M 7/00* (2006.01)
(52) U.S. Cl. .......................................... 363/65; 323/225
(58) Field of Classification Search ............. 363/65–72; 323/222, 225, 282, 284, 285
See application file for complete search history.

(56) References Cited

U.S. PATENT DOCUMENTS

| 4,720,667 | A | | 1/1988 | Lee et al. | |
|---|---|---|---|---|---|
| 5,396,165 | A | * | 3/1995 | Hwang et al. | ................ 323/222 |
| 5,663,635 | A | | 9/1997 | Vinciarelli et al. | |
| 6,836,103 | B2 | * | 12/2004 | Brooks et al. | ................. 363/65 |

FOREIGN PATENT DOCUMENTS

| JP | 4-105552 A | 4/1992 |
|---|---|---|
| JP | 7-295662 A | 11/1995 |

* cited by examiner

*Primary Examiner*—Jessica Han
(74) *Attorney, Agent, or Firm*—Frishauf, Holtz, Goodman & Chick, P.C.

(57) ABSTRACT

In a current resonance type multi-phase DC/DC converting apparatus for combining, using an output capacitor, M converter output voltages produced by M current resonance type multi-phase DC/DC converters connected in parallel to each other to produce an output voltage, each of the M current resonance type multi-phase DC/DC converters has N current resonance type DC/DC converters connected in parallel with one another. The N current resonance type DC/DC converters have N resonance circuits, respectively. Each of the M current resonance type multi-phase DC/DC converters shares a resonance inductor of the N resonance circuits.

14 Claims, 12 Drawing Sheets

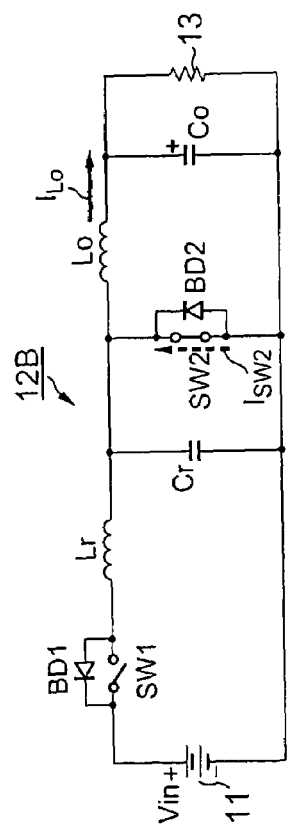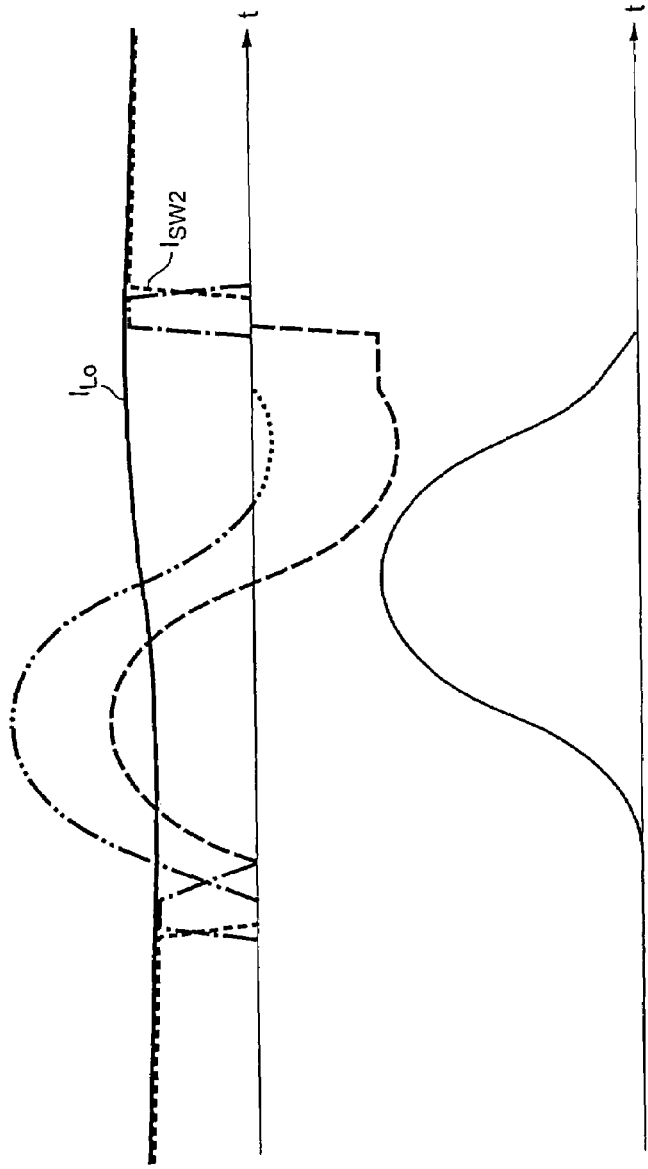
FIG. 4A
PRIOR ART
FIG. 4B
PRIOR ART
FIG. 4C
PRIOR ART

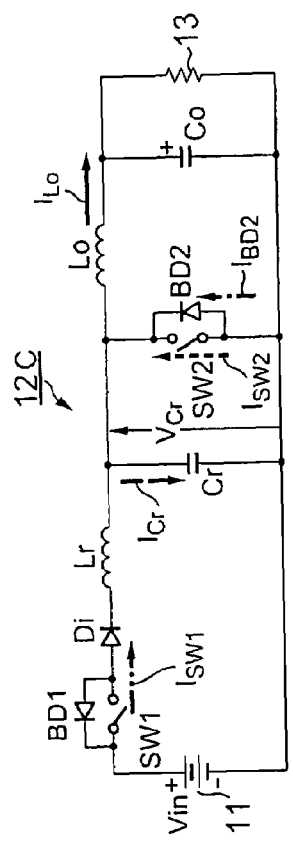
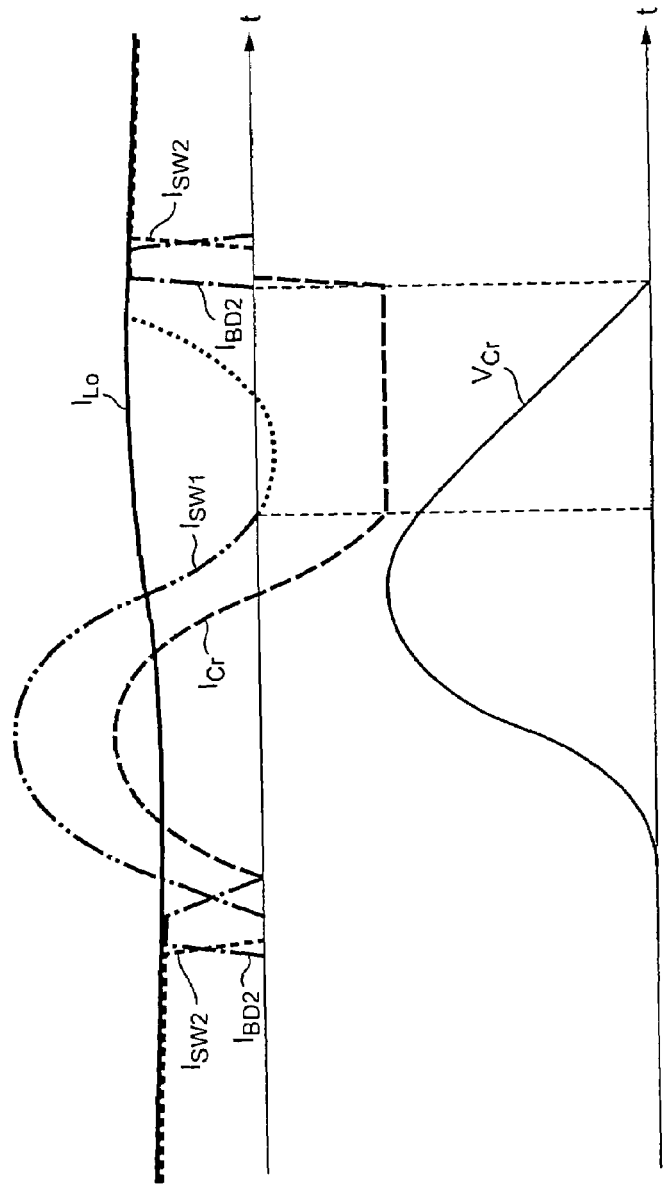
FIG. 5A
PRIOR ART
FIG. 5B
PRIOR ART
FIG. 5C
PRIOR ART

CURRENT RESONANCE TYPE MULTI-PHASE DC/DC CONVERTING APPARATUS HAVING A LARGE CAPACITY WITHOUT RESTRICTING MULTI-PHASE This application claims priority to prior application JP 2005-186569, the disclosure of which is incorporated herein by reference.

BACKGROUND OF THE INVENTION

This invention relates to a power converter and, in particular, to a current resonance type DC/DC multi-phase converting apparatus for combining a plurality of converter output voltages produced by a plurality of current resonance type DC/DC converters which are connected in parallel with one another and which include a plurality of resonance circuits to supply a combined voltage to a load as an output voltage and to a control method thereof.

In the manner which is well known in the art, the DC/DC converter is a power converter for converting an input DC voltage (which will later be merely also called an "input voltage") into an output DC voltage (which will later be merely also called an "output voltage") which is different from the input DC voltage.

As one of the DC/DC converters, there is a PWM (pulse width modulation) type DC/DC converter in the manner which will later be described in conjunction with FIG. 1.

In order to obtain high-speed, a large-capacity, a low ripple, and so on, attempt have been often made to connect a plurality of DC/DC converters in parallel with one another. On other words, there is a DC/DC converter for switching an input voltage using a plurality of switch circuits to supply an output load to a load. Such as a DC/DC converter comprising the plurality of switch circuits is called a multi-phase DC/DC converter. That is, the multi-phase DC/DC converter makes the plurality of switch circuits turn on/off at the same period and different phases to effectively enhance a switching frequency on large current output (heavy load). Such a multi-phase DC/DC converter is used, for example, as a power converter for a CPU (central processing unit).

Although a PWM type multi-phase DC/DC converter will later be described in conjunction with FIG. 2, the PWM type multi-phase DC/DC converter comprises a plurality of PWM type DC/DC converters which are connected in parallel with one another. Each PWM type DC/DC converter comprises an energizing switch. The PWM type multi-phase DC/DC converter is compatible with the high-speed and the low ripple by carrying out on-off control of energizing switches in the PWM type DC/DC converters with phases shifted.

However, the PWM type DC/DC converter is disadvantageous in that it has a large switching loss when the energizing switch changes from an on state to an off state or changes from an off state to an on state.

As a DC/DC converter which is capable of eliminating such a switching loss, a current resonance type DC/DC converter is known, for example, in U.S. Pat. No. 5,663,635 issued by Vinciarelli et al.

Although the current resonance type DC/DC converter will later be described in conjunction with FIG. 3, the current resonance type DC/DC converter includes a resonance circuit comprising a resonance inductor and a resonance capacitor. In the current resonance type DC/DC converter, a current flows through the resonance inductor only for a resonance duration with respect to a switching period. The current does not flow through the resonance inductor for a duration obtained by removing the resonance duration from the switching period. When an input/output voltage ratio becomes smaller, the switching period with respect to the resonance duration becomes longer. As a result, durations where the current does not flow through the resonance inductor increase, as described, for example, in U.S. Pat. No. 4,720,667 issued by Lee et al.

Although a conventional current resonance type multi-phase DC/DC converter will later be described in conjunction with FIG. 6, the conventional current resonance type DC/DC converter is advantageous in that it is possible to reduce the switching loss in comparison with the PWM type multi-phase DC/DC converter. Such a current resonance type multi-phase DC/DC converter is described, for example, in Japanese Unexamined Patent Publication Tokkai No. Hei 7-295662 or JP H7-295662 A. Another current resonance type multi-phase DC/DC converter having similar structure is disclosed, for example, in Japanese Unexamined Patent Publication Tokkai No. Hei 4-105552 or JP H4-105552 A.

However, it is necessary for the conventional current resonance type multi-phase DC/DC converter to prepare a plurality of resonance inductors which occupies a very large mounted area on a substrate.

Consequently, the present inventor suggested a current resonance type multi-phase DC/DC converter which is capable of reducing a mounted area on the substrate by sharing one resonance inductor in the plurality of resonance circuits.

Although the suggested current resonance type multi-phase DC/DC converter will later be described in conjunction with FIG. 7, it is possible for the suggested current resonance type multi-phase DC/DC converter to drastically reduce the mounted area of the resonance inductor which occupies on the substrate. However, in the manner which will later be described in conjunction with FIGS. 9A to 9F, the suggested current resonance type multi-phase DC/DC converter is disadvantageous in that it is difficult to have a large capacity.

SUMMARY OF THE INVENTION

It is therefore an object of the present invention to provide a current resonance type multi-phase DC/DC converting apparatus which is has a large capacity without restricting multi-phase.

Other objects of this invention will become clear as the description proceeds.

On describing the gist of a first aspect of this invention, it is possible to be understood that a current resonance type multi-phase DC/DC converting apparatus comprises M current resonance type multi-phase DC/DC converters connected in parallel with one another, where M represents a first integer which is not less than two. The M current resonance type multi-phase DC/DC converters produce M converter output voltages in response to an input voltage. The current resonance type multi-phase DC/DC converting apparatus comprises an output capacitor for combining the M converter output voltages to produce an output voltage. According to the first aspect of this invention, each of the M current resonance type multi-phase DC/DC converters comprises N current resonance type DC/DC converters which are connected in parallel with one another, where N represents a second integer which is not less than two. The N current resonance type DC/DC converters include N resonance circuits, respectively. Each of the M current resonance type multi-phase DC/DC converters shares a resonance inductor of the N resonance circuits.

In the above-mentioned current resonance type multi-phase DC/DC converting apparatus, each of the M current resonance type multi-phase DC/DC converters may comprise a step-down current resonance type multi-phase DC/DC converter, a step-up current resonance type multi-phase DC/DC converter, or a polarity reversing current resonance type multi-phase DC/DC converter.

On describing the gist of a second aspect of this invention, it is possible to be understood that a method is of controlling a current resonance type multi-phase DC/DC converting apparatus comprising M current resonance type multi-phase DC/DC converters which are connected in parallel with one another and each of which comprises N current resonance type DC/DC converters including N resonance circuits sharing a resonance inductor and N switches, respectively, where M represents a first integer which is not less than two and N represents a second integer which is not less than two. The M current resonance type multi-phase DC/DC converters produce M converter output voltages in response to an input voltage. The current resonance type multi-phase DC/DC converting apparatus comprises an output capacitor for combining the N converter output voltages to produce an output voltage. According to the second aspect of this invention, the method comprises the step of, in each of the M current resonance type multi-phase DC/C converters, equating a switching frequency of a plurality of control signals for turning the N switches on/off and shifting phases of the plurality of control signals to one another.

In the above-mentioned method, each of the M current resonance type multi-phase DC/DC converters may comprise a step-down current resonance type multi-phase DC/DC converter, a step-up current resonance type multi-phase DC/DC converter, or a polarity reversing current resonance type multi-phase DC/DC converter.

On describing the gist of a third aspect of this invention, it is possible to be understood that a current resonance type multi-phase DC/DC converting apparatus is for generating an output voltage from an input voltage to supply the output voltage to a load. According to the third aspect of this invention, the current resonance type multi-phase DC/DC converting apparatus comprises first through M-th current resonance type multi-phase DC/DC converters for producing first through M-th converter output voltages in response to the input voltage where M represents a first integer which is not less than two, an output capacitor for combing the first through the M-th converter output voltages to produce the output voltage, and a control circuit for controlling driving of the first through the M-th current resonance type multi-phase DC/DC converters on the basis of the output voltage.

According to the third aspect of this invention, in the above-mentioned current resonance type multi-phase DC/DC converting apparatus, an m-th current resonance type multi-phase DC/DC converters where m represents a variable between one and the first integer M, both inclusive, may comprise first through N-th current resonance type DC/DC converters, connected in parallel with one another, including first through N-th resonance capacitors and first through N-th switches, respectively, where N represents a second integer which is not less than two. The first through the N-th current resonance type DC/DC converters produce first through N-th switched currents, respectively. A resonance inductor collaborates the first through the N-th resonance capacitors to compose first through N-th resonance circuits, respectively. A combining arrangement combines the first through the N-th switched currents to produce an m-th converter output voltage. Each of the M current resonance type multi-phase DC/DC converters may comprise a step-down current resonance type multi-phase DC/DC converter, a step-up current resonance type multi-phase DC/DC converter, or a polarity reversing current resonance type multi-phase DC/DC converter. The control circuit preferably may turn, in each of the first through the M-th current resonance type multi-phase DC/DC converters, the first through the N-th switches on/off by using first through N-th control signals which have the same switching frequency and different phases. The control circuit desirably may turn, in each of the first through the M-th current resonance type multi-phase DC/DC converters, M n-th switches on/off by using M n-th control signals which have the same switching frequency and different phases, where n represents a variable between one and N, both inclusive.

BRIEF DESCRIPTION OF THE DRAWING

FIG. 4A is a circuit diagram showing structure of a conventional full-wave current resonance type DC/DC converter;

FIG. 4B shows waveforms of currents flowing through respective portions of the full-wave current resonance type DC/DC converter illustrated in FIG. 4A;

FIG. 4C shows a waveform of a voltage between both ends of a resonance capacitor of the full-wave current resonance type DC/DC converter illustrated in FIG. 4A;

FIG. 5A is a circuit diagram showing structure of a conventional half-wave current resonance type DC/DC converter;

FIG. 5B shows waveforms of currents flowing through respective portions of the half-wave current resonance type DC/DC converter illustrated in FIG. 5A;

FIG. 5C shows a waveform of a voltage between both ends of a resonance capacitor of the half-wave current resonance type DC/DC converter illustrated in FIG. 5A;

DESCRIPTION OF THE PREFERRED EMBODIMENTS

Figure 1:
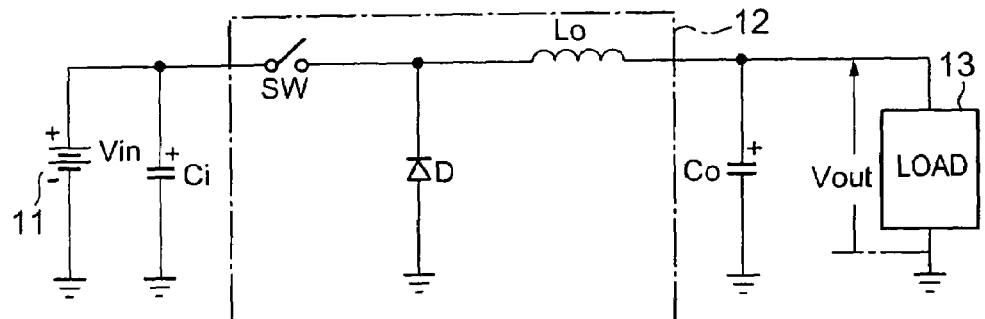
FIG. 1 is a circuit diagram showing structure of a conventional PWM type DC/DC converter.

Referring to FIG. 1, a conventional DC/DC converter 12 will first be described in order to facilitate an understanding of the present invention. In the example being illustrated, the DC/DC converter 12 is a PWM (pulse width modulation) type DC/DC converter. The illustrated PWM type DC/DC converter 12 is a step-down type. That is, an output voltage Vout is lower than an input voltage Vin. An input power supply is connected in parallel with an input capacitor Ci. A load 13 is connected in parallel with a capacitance element (an output capacitor) Co.

The illustrated PWM type DC/DC converter 12 comprises an energizing switch SW, a diode D, and an output inductor Lo.

The energizing switch SW has an end connected to a positive electrode of the input power supply 11. The energizing switch SW has another end connected to a cathode of the diode D and to an end of the output inductor Lo. The diode D has an anode which is grounded. The output inductor Lo has another end which is grounded through the output capacitor Co. The output capacitor Co has both ends at which the output voltage Vout occurs. In addition, control of turning on/off of the emerging switch SW is carried out by a PWM signal supplied from a control circuit (not shown).

On the other hand, in order to obtain high-speed, a large-capacity, a low ripple, and so on, attempt have been often made to connect a plurality of DC/DC converters in parallel. On other words, there is a DC/DC converter for switching an input voltage using a plurality of switch circuits to supply an output voltage to a load. Such as a DC/DC converter comprising the plurality of switch circuits is called a multi-phase DC/DC converter. That is, the multi-phase DC/DC converter makes the plurality of switch circuits turn on/off at the same period and different phases to effectively enhance a switching frequency on large current output (heavy load). Such a multi-phase DC/DC converter is used, for example, as a power converter for a CPU (central processing unit).

Figure 2:
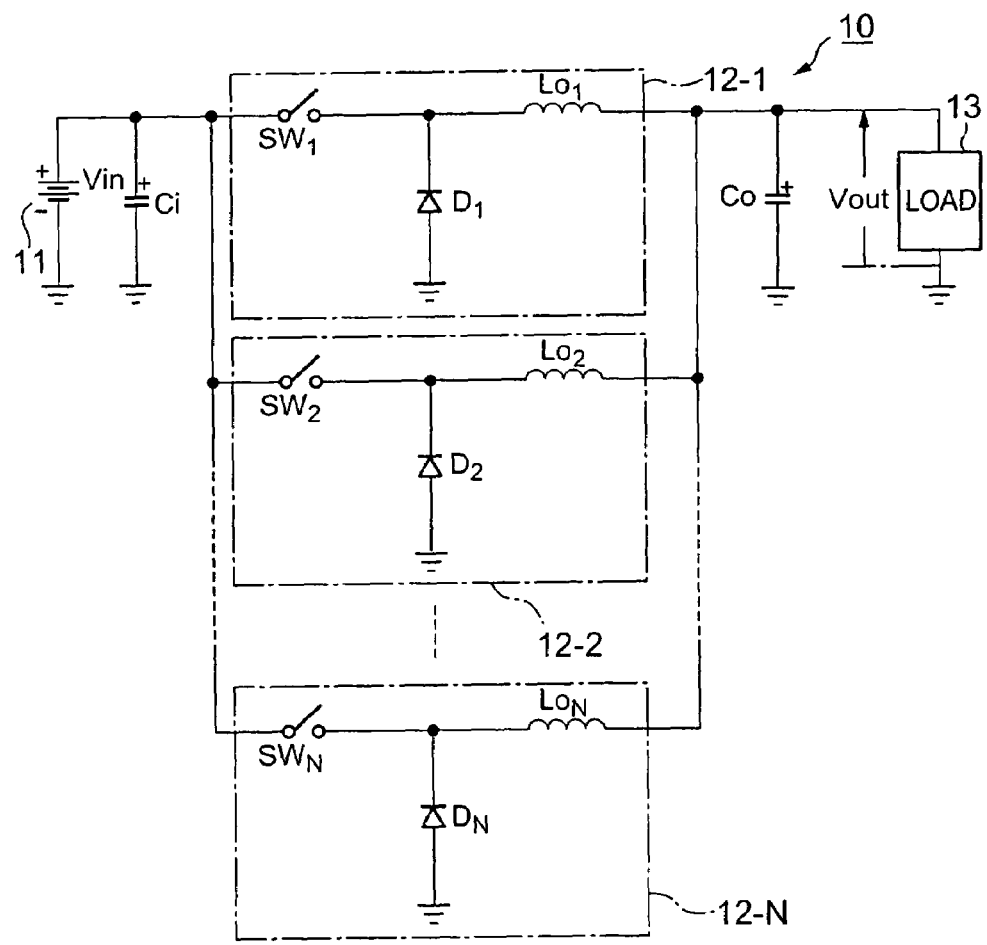
FIG. 2 is a circuit diagram showing structure of a conventional PWM type multi-phase DC/DC converter.

Referring to FIG. 2, the description will proceed to a PWM type multi-phase DC/DC converter 10 comprising a plurality of PWM type DC/DC converters 12 which are connected in parallel with one another and each of which is illustrated in FIG. 1. The illustrated PWM type multi-phase DC/DC converter 10 comprises first through N-th PWM type DC/DC converters 12-1, 12-2, ..., and 12-N which are supplied with the input voltage Vin from the input power supply 11, where N represents an integer which is not less than two. The first through the N-th PWM type DC/DC converters 12-1 to 12-N switch the input voltage Vin to produce first through N-th switched currents. The first through the N-th switched currents are combined by the output capacitor Co which produces the output voltage Vout between both ends thereof. The output voltage Vout is supplied to the load 13.

The first PWM type DC/DC converter 12-1 comprises a first energizing switch $SW_1$, a first diode $D_1$, and a first output inductor $Lo_1$. Similarly, the second PWM type DC/DC converter 12-2 comprises a second energizing switch $SW_2$, a second diode $D_2$, and a second output inductor $Lo_2$. The N-th PWM type DC/DC converter 12-N comprises an N-th energizing switch $SW_N$, an N-th diode $D_N$, and an N-th output inductor $Lo_N$.

In general, an n-th PWM type DC/DC converter 12-n comprises an n-th energizing switch $SW_n$, an n-th diode $D_n$, and an n-th output inductor $Lo_n$, where n represents a variable between 1 and N, both inclusive. The n-th energizing switch $SW_n$ has an end connected to the positive electrode of the input power supply 11. The n-th energizing switch $SW_n$ has another end which is connected to a cathode of the n-th diode $D_n$ and to an end of the n-th output inductor $Lo_n$. The n-th diode $D_n$ has an anode which is grounded. The n-th output inductor $Lo_n$ has another end which is grounded through the output capacitor Co.

The illustrated PWM type multi-phase DC/DC converter 10 is compatible with the high-speed and the low ripple by carrying out on-off control of the first through the N-th energizing switches $SW_1$ to $SW_N$ in the first through the N-th PWM type DC/DC converters 12-1 to 12-N with phases shifted.

However, the PWM type DC/DC converter 12 illustrated in FIG. 1 is disadvantageous in that it has a large switching loss when the energizing switch SW changes from an on state to an off state or changes from an off state to an on state.

As a DC/DC converter which is capable of eliminating such a switching loss, a current resonance type DC/DC converter is known, for example, in the above-mentioned U.S. Pat. No. 5,663,635 issued by Vinciarelli et al.

Figure 3:
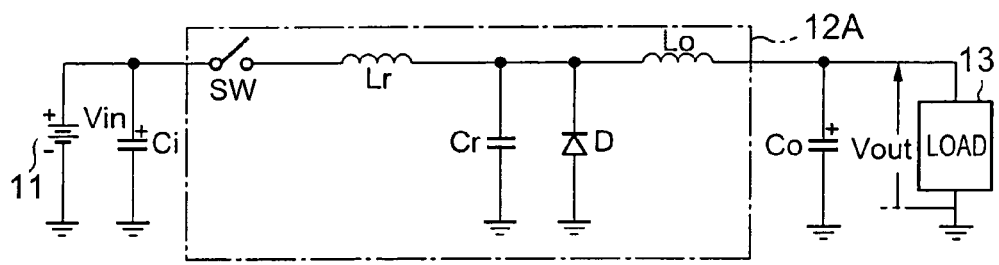
FIG. 3 is a circuit diagram showing structure of a conventional step-down current resonance type DC/DC converter according to this invention.

Referring to FIG. 3, the description will proceed to a current resonance type DC/DC converter 12A. The illustrated current resonance type DC/DC converter 12A is also a step-down type. That is, the output voltage Vout is lower than the input voltage Vin.

The current resonance type DC/DC converter 12A is similar in structure to the PWM type DC/DC converter 12 illustrated in FIG. 1 except that a resonance circuit comprising a resonance inductor Lr and a resonance capacitor Cr is further added in the current resonance type DC/DC converter 12A. Accordingly, those having similar functions are depicted at the same reference symbols and description therefore is omitted to simplify description.

The resonance circuit comprising the resonance inductor Lr and the resonance capacitor Cr is inserted between the energizing switch SW and the diode D. Specifically, the resonance inductor Lr has an end connected to the other end of the energizing switch SW. The resonance inductor Lr has another end which is grounded through the resonance capacitor Cr. The resonance capacitor Cr is connected in parallel with the diode D. That is, the resonance capacitor Cr has an end which is connected to the cathode of the diode D and to an end of the output inductor Lo. The resonance capacitor Cr has another end which is grounded.

In lieu of the diode D, a short-circuit switch may be used. In addition, the input capacitor Ci may be deleted.

Referring now to FIGS. 4A, 4B, and 4C, description will be made as regards operation of the current resonance type DC/DC converter. The illustrated current resonance type DC/DC converter depicted at 12B is similar in structure to the current resonance type DC/DC converter 12A illustrated in FIG. 3 except that the short-circuit switch is used in place of the diode D. Accordingly, a switch corresponding to the energizing switch SW is called a first switch SW1 while the short-circuit switch in place of the diode D is depicted at a second switch SW2. In addition, the input capacitor Ci is deleted. A first body diode BD1 is connected in parallel with the first switch (the energizing switch) SW1 while a second body diode BD2 is connected in parallel with the second switch (the short-circuit switch) SW2. The first switch (the energizing switch) SW1 is called a high-side switch while the second switch (the short-circuit switch) SW2 is called a low-side switch. The illustrated resonance current type DC/DC converter 12B is a full-wave type.

FIG. 4A shows on/off states of the first and the second switches SW1 and SW2 of the full-wave current resonance type DC/DC converter 12B. FIG. 4B shows waveforms of currents flowing through respective portions of the full-wave current resonance type DC/DC converter 12B. FIG. 4C shows a waveform of a both-end voltage of the resonance capacitor Cr of the full-wave current resonance type DC/DC converter 12B.

FIG. 5A shows a half-wave current resonance type DC/DC converter 12C. FIGS. 5B and 5C show waveforms for use in describing operation of the half-wave current resonance type DC/DC converter 12C. The illustrated half-wave current resonance type DC/DC converter 12C is similar in structure to the full-wave current resonance type DC/DC converter 12B illustrated in FIG. 4A except that a diode Di is inserted between the first switch (the energizing switch) SW1 and the resonance inductor Lr.

FIG. 5B shows waveforms of currents flowing through respective portions of the half-wave current resonance type DC/DC converter 12C. FIG. 5C shows a waveform of a both-end voltage of the resonance capacitor Cr of the half-wave current resonance type DC/DC converter 12C.

A difference in operation between the full-wave current resonance type DC/DC converter 12B and the half-wave current resonance type DC/DC converter 12C is as follows. More specifically, in the full-wave current resonance type DC/DC converter 12B, after the current $I_{SW1}$ becomes zero, the current flows in an opposite direction to resonate, and the first switch SW1 is turned off at a time instance when the current becomes zero again. On the other hand, in the half-wave current resonance type DC/DC converter 12C, the first switch SW1 is turned off at a time instance when the current first becomes zero. This is because there is the diode Di and the current $I_{SW1}$ does not flow in the opposite direction.

In addition, the current flows through the resonance inductor Lr only for a resonance duration with respect to a switching period. The current does not flow through the resonance inductor Lr for a duration obtained by removing the resonance duration from the switching period. When an input/output voltage ratio Vin/Vout becomes smaller, the switching period with respect to the resonance duration becomes longer. As a result, durations where the current does not flow through the resonance inductor Lr increase, as described, for example, in the above-mentioned U.S. Pat. No. 4,720,667 issued by Lee at al.

Figure 6:
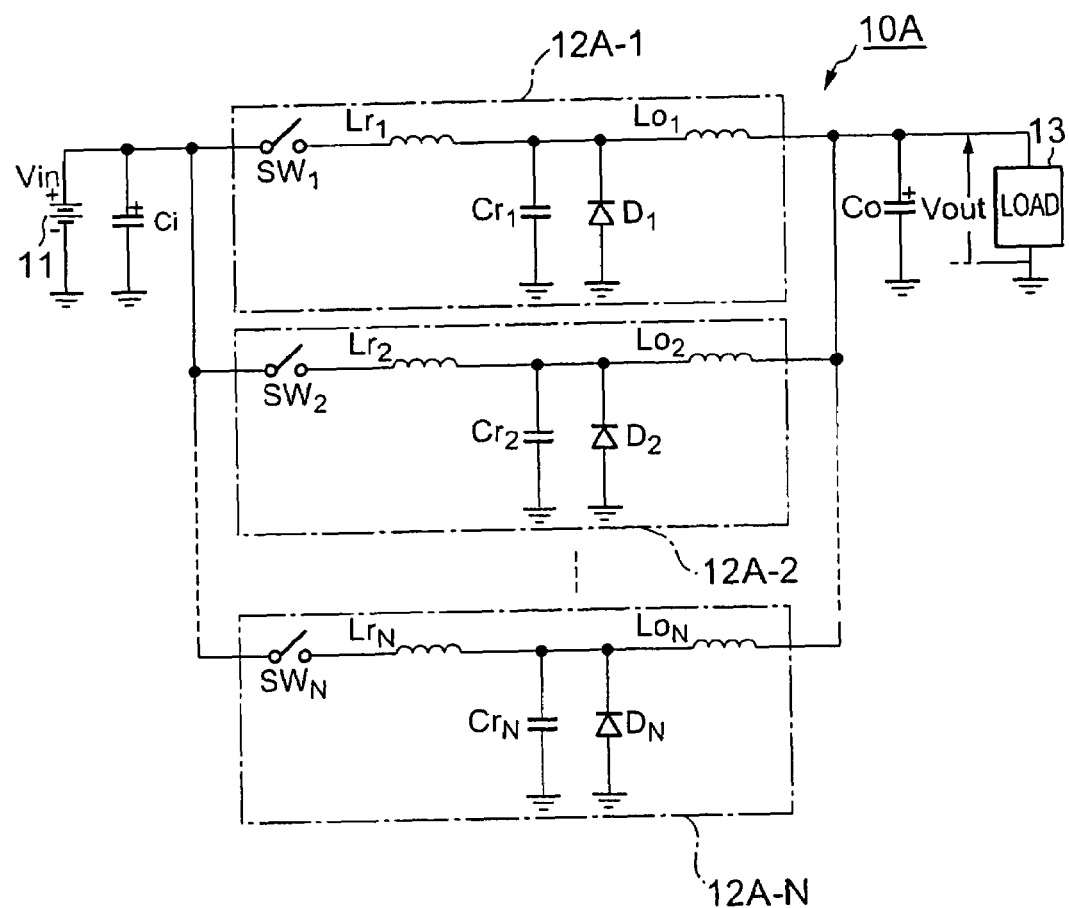
FIG. 6 is a circuit diagram showing structure of a conventional current resonance type multi-phase DC/DC converter.

Referring to FIG. 6, a conventional current resonance type multi-phase DC/DC converter 10A will be described in order to facilitate an understanding of the present invention. The current resonance type multi-phase DC/DC converter 10A comprises a plurality of current resonance type DC/DC converters 12A which are connected in parallel with one another and each of which is illustrated in FIG. 3. Such a current resonance type multi-phase DC/DC converter 10A is described, for example, in the above-mentioned JP H7-295662 A. Another current resonance type multi-phase DC/DC converter having similar structure is disclosed, for example, in the above-mentioned JP H4-105552 A.

The illustrated current resonance type multi-phase DC/DC converter 10A comprises first through N-th current resonance type DC/DC converters 12A-1, 12A-2, . . . and 12A-N which are supplied with an input voltage Vin from an input power supply 11, where N represents an integer which is not less than two. The first through the N-th current resonance type DC/DC converters 12A-1 to 12A-N switch the input voltage Vin to produce first through N-th switched currents. The first through the N-th switched currents are combined by the output capacitor Co which produces the output voltage Vout at both ends thereof. The output voltage Vout is supplied to the load 13. Inasmuch as the illustrated current resonance type multi-phase DC/DC converter 10A is the step-down type, the output voltage Vout is lower than the input voltage Vin.

The first current resonance type DC/DC converter 12A-1 comprises a first energizing switch $SW_1$, a first resonance inductor $Lr_1$, a first resonance capacitor $Cr_1$, a first diode $D_1$, and a first output inductor $Lo_1$. Likewise, the second current resonance type DC/DC converter 12A-2 comprises a second energizing switch $SW_2$, a second resonance inductor $Lr_2$, a second resonance capacitor $Cr_2$, a second diode $D_2$, and a second output inductor $Lo_2$. The N-th current resonance type DC/DC converter 12A-N comprises an N-th energizing switch $SW_N$, an N-th resonance inductor $Lr_N$, an N-th resonance capacitor $Cr_N$, an N-th diode $D_N$, and an N-th output inductor $Lo_N$.

In general, an n-th current resonance type DC/DC converter 12A-n comprises an n-th energizing switch $SW_n$, an n-th resonance inductor $Lr_n$, an n-th resonance capacitor $Cr_n$, an n-th diode $D_n$, and an n-th output inductor $Lo_n$, where n represents a variable between 1 and N, both inclusive. The n-th energizing switch $SW_n$ has an end connected to the positive terminal of the input power supply 11. The n-th energizing switch $SW_n$ has another end connected to an end of the n-th resonance capacitor $Lr_n$. The n-th resonance inductor $Lr_n$ has another end which is grounded through the n-th resonance capacitor $Cr_n$. The n-th resonance capacitor $Cr_n$ is connected in parallel with the n-th diode $D_n$. More specifically, the n-th diode $D_n$ has a cathode connected to a connection point between the n-th resonance inductor $Lr_n$ and the n-th resonance capacitor $Cr_n$. The n-th diode $D_n$ has an anode which is grounded. The cathode of the n-th diode $D_n$ is connected to an end of the n-th output inductor $Lo_n$. The n-th output inductor $Lo_n$ has another end which is grounded through the output capacitor Co.

According to the current resonance type multi-phase DC/DC converter 10A having such a structure, it is possible to reduce the switching loss in comparison with the PWM type multi-phase DC/DC converter 10 illustrated in FIG. 2.

However, it is necessary for the conventional current resonance type multi-phase DC/DC converter 10A illustrated in FIG. 6 to prepare a plurality of resonance inductors (N in the example illustrated in FIG. 6) and the resonance inductors $Lr_1$ to $Lr_N$ occupies a very large mounted area on a substrate.

Consequently, the present inventor suggested a current resonance type multi-phase DC/DC converter which is capable of reducing a mounted area of the resonance inductor on a substrate by sharing the resonance inductor Lr in the plurality of resonance circuits.

Figure 7:
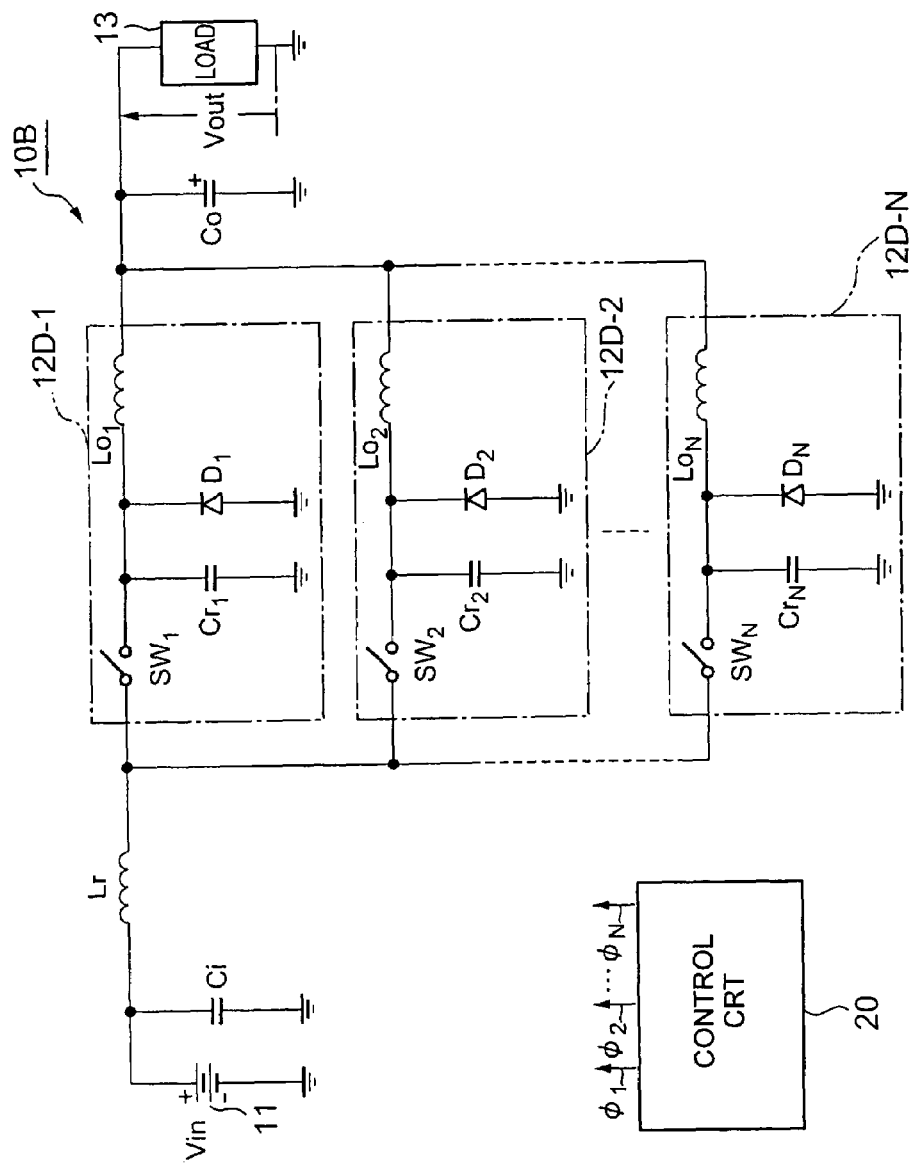
FIG. 7 is a circuit diagram showing structure of a related current resonance type multi-phase DC/DC converter suggested by the present inventor.

Referring to FIG. 7, the description will proceed to a related current resonance type multi-phase DC/DC converter depicted at 10B suggested by the present inventor.

The illustrated current resonance type multi-phase DC/DC converter 10B comprises first through N-th current resonance type DC/DC converters 12D-1, 12D-2, . . . , and 12D-N and a resonance inductor Lr which is shared in the first through the N-th current resonance type DC/DC converters 12D-1 to 12D-N, where N represents an integer which is not less than two. An input capacitor Ci is connected in parallel with the input power supply 11. An output capacitor Co is connected in parallel with the load 13. The current resonance type multi-phase DC/DC converter 10B is a step-down type. That is, the output voltage Vout is lower than the input voltage Vin.

The resonance inductor Lr has an end connected to the positive electrode of the input power supply 11. The resonance inductor Lr has another end connected to input terminals of the first through the N-th current resonance type DC/DC converters 12D-1 to 12D-N.

The first current resonance type DC/DC converter 12D-1 comprises a first energizing switch $SW_1$, a first resonance capacitor $Cr_1$, a first diode $D_1$, and a first output inductor $Lo_1$. Similarly, the second current resonance type DC/DC converter 12D-2 comprises a second energizing switch $SW_2$, a second resonance capacitor $Cr_2$, a second diode $D_2$, and a second output inductor $Lo_2$. The N-th current resonance type DC/DC converter 12D-N comprises an N-th energizing switch $SW_N$, an N-th resonance capacitor $Cr_N$, an N-th diode $D_N$, and an N-th output inductor $Lo_N$. Produced by the first through the N-th current resonance type DC/DC converters 12D-1 to 12D-N, first through N-th switched currents are combined by the output capacitor Co which produces the output voltage Vout between both ends thereof. The output voltage Vout is supplied to the load 13.

In general, an n-th current resonance type DC/DC converter 12D-n comprises an n-th energizing switch $SW_n$, an n-th resonance capacitor $Cr_n$, an n-th diode $D_n$, and an n-th output inductor $Lo_n$. The n-th energizing switch $SW_n$ has an end connected to the other end of the resonance inductor Lr. The n-th energizing switch $SW_n$ has another end which is grounded through the n-th resonance capacitor $Cr_n$. The n-th diode $D_n$ is connected in parallel with the n-th resonance capacitor $Cr_n$. Specifically, the n-th diode $D_n$ has a cathode connected to the other end of the n-th energizing switch $SW_n$. The n-th diode $D_n$ has an anode which is grounded. The n-th output inductor $Lo_n$ has an end connected to the cathode of the n-th diode $D_n$. The n-th output inductor $Lo_n$ is grounded through the output capacitor Co.

A combination of the resonance inductor Lr and the n-th resonance capacitor $Cr_n$ constitutes an n-th resonance circuit in the n-th current resonance type DC/DC converter 12D-n.

Turning on/off of the first through the N-th energizing switches $SW_1$ to $SW_N$ is controlled by first through N-th control signals $\phi_1, \phi_2, \ldots$, and $\phi_N$ supplied from a control circuit 20. The control circuit 20 is supplied with the output voltage Vout. In addition, the control circuit 20 is supplied with a current detected signal from a current detector (not shown) for detecting a current $I_{Lr}$ flowing through the resonance inductor Lr. The first through the N-th control signals $\phi_1$ to $\phi_N$ have the same switching frequency $f_{SW}$ but have different phases which are shifted to one another in the manner which will later be described. For a duration where it is unnecessary to flow the current $I_{Lr}$ through the resonance inductor Lr after a resonance duration in a k-th resonance circuit (the resonance inductor Lr and a k-th resonance capacitor $Cr_k$) of a k-th current resonance type DC/DC converter 12D-k comes an end, where k represents a variable between one and N, the control circuit 20 turns on a (k+1)-th energizing switch $SW_{(k+1)}$ of a (k+1)-th current resonance type DC/DC converter 12D-(k+1) which should be subsequently driven (where (k+1) is equal to 1 when k is equal to N) to use the resonance inductor Lr as a (k+1)-th resonance inductor in a (k+1)-th resonance circuit of the (k+1)-th current resonance type DC/DC converter 12D-(k+1).

As shown in FIG. 7, inasmuch as the current resonance type multi-phase DC/DC converter 10B shares one resonance inductor Lr in the first through the N-th current resonance type DC/DC converters 12D-1 to 12D-N, it is possible to drastically reduce the mounted area of the resonance inductor Lr which occupies on the substrate.

Incidentally, in the current resonance type DC/DC converter 12A illustrated in FIG. 3, an ON time interval of the energizing switch SW is substantially determined by a resonance frequency fr which is determined by an inductance value of the resonance inductor Lr and a capacitance value of the resonance capacitor Cr. In addition, the output voltage Vout is substantially determined by a ratio between the switching frequency $f_{SW}$ and the resonance frequency fr. In other words, the switching frequency $f_{SW}$ is substantially determined by the output voltage Vout and the resonance frequency fr.

On the other hand, in also the current resonance type multi-phase DC/DC converter 10B merging a plurality of resonance inductors into a single resonance inductor Lr illustrated in FIG. 7, an ON time interval in each of the first through the N-th energizing switches $SW_1$ to $SW_N$ is substantially determined by the resonance frequency and the output voltage Vout is substantially determined by the ratio between the switching frequency $f_{SW}$ and the resonance frequency fr.

In a case of the current resonance type multi-phase DC/DC converter 10B comprising only one resonance inductor Lr illustrated in FIG. 7, a portion where the ON time intervals of the first through the N-th energizing switches $SW_1$ to $SW_N$ overlap is prohibited. However, there is the portion where the ON time intervals overlap when the phase number N increases. For example, by simply calculation, the phase number N is limited to two in a case where the input voltage Vin is stepped down to Vin/2 to produce the output voltage Vout. In addition, in another case where the input voltage Vin is stepped down to Vin/3 to produce the output voltage Vout, the phase number N is limited to three.

Figure 8:
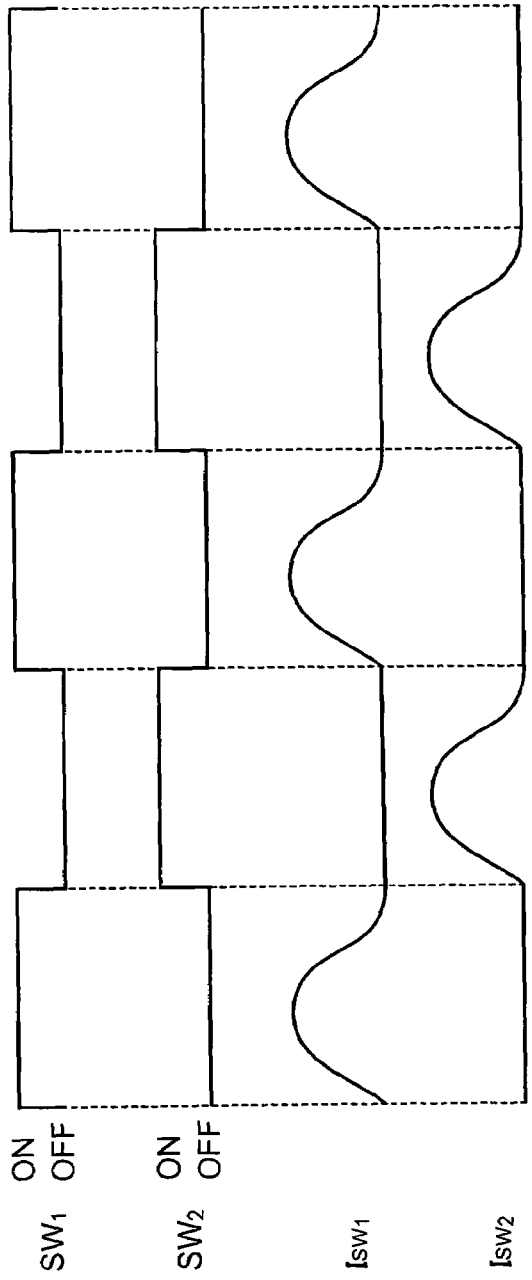
FIGS. 8A through 8D show waveforms for use in describing operation of the current resonance type multi-phase DC/DC converter illustrated in FIG. 7 in a case where N=2 and Vout=Vin/2.

FIGS. 8A through 8D show waveforms for use in describing operation of the current resonance type multi-phase DC/DC converter 10B illustrated in FIG. 7 in a case where the phase number N is equal to two and the output voltage Vout equal to half of the input voltage Vin is produced (Vout=Vin/2). FIG. 8A shows an ON/OFF state of the first energizing switch $SW_1$. FIG. 8B shows an ON/OFF state of the second energizing switch $SW_2$. FIG. 8C shows a current $I_{SW1}$ flowing through the first energizing switch $SW_1$. FIG. 8D shows a current $I_{SW2}$ flowing through the second energizing switch $SW_2$.

As shown in FIGS. 8A to 8D, it is understood that the phase number N is limited to two in the current resonance type multi-phase DC/DC converter 10B illustrated in FIG. 7 in a case where the output voltage Vout equal to half of the input voltage Vin is produced.

Figure 9:
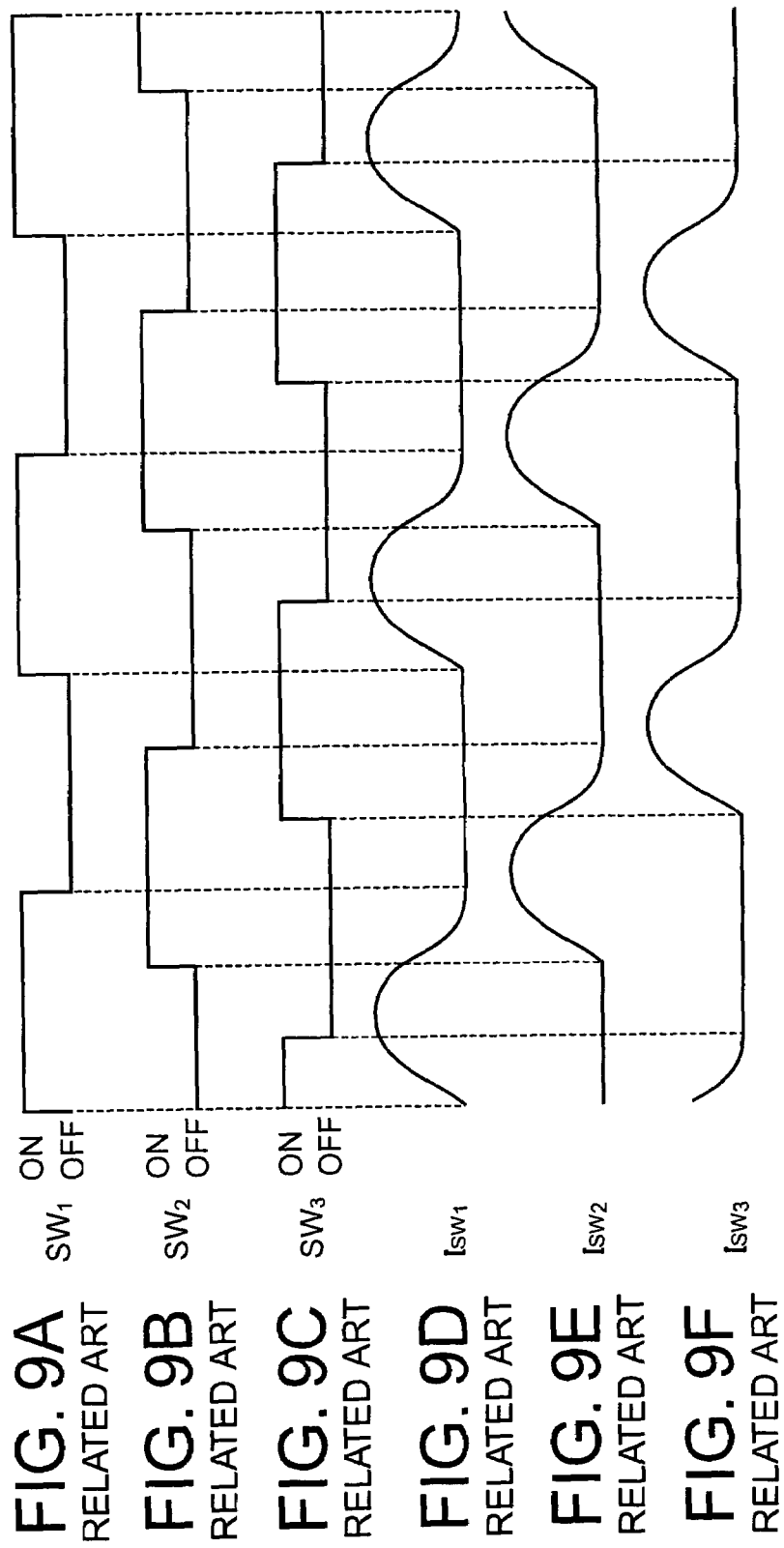
FIGS. 9A through 9F show waveforms for use in describing operation of the current resonance type multi-phase DC/DC converter illustrated in FIG. 7 in a case where N=3 and Vout=Vin/2.

FIGS. 9A through 9F show waveforms for use in describing operation of the current resonance type multi-phase DC/DC converter 10B illustrated in FIG. 7 in a case where the phase number N is equal to three and the output voltage Vout equal to half of the input voltage Vin is produced (Vout=Vin/2). FIG. 9A shows an ON/OFF state of the first energizing switch $SW_1$. FIG. 9B shows an ON/OFF state of the second energizing switch $SW_2$. FIG. 9C shows an ON/OFF state of the third energizing switch $SW_3$. FIG. 9D shows a current $I_{SW1}$ flowing through the first energizing switch $SW_1$. FIG. 9E shows a current $I_{SW2}$ flowing through the second energizing switch $SW_2$. FIG. 9F shows a current $I_{SW3}$ flowing through the third energizing switch $SW_3$.

As shown in FIGS. 9A to 9F, it is understood that the ON time intervals of the first through the three energizing switches $SW_1$ to $SW_3$ interpose when the phase number is equal to three in the current resonance type multi-phase DC/DC converter 10B illustrated in FIG. 7 in case where the output voltage Vout equal to half of the input voltage Vin is produced. As a result, it is disadvantageous in that it is difficult to have a large capacity, as mentioned in the preamble of the instant specification.

Figure 10:
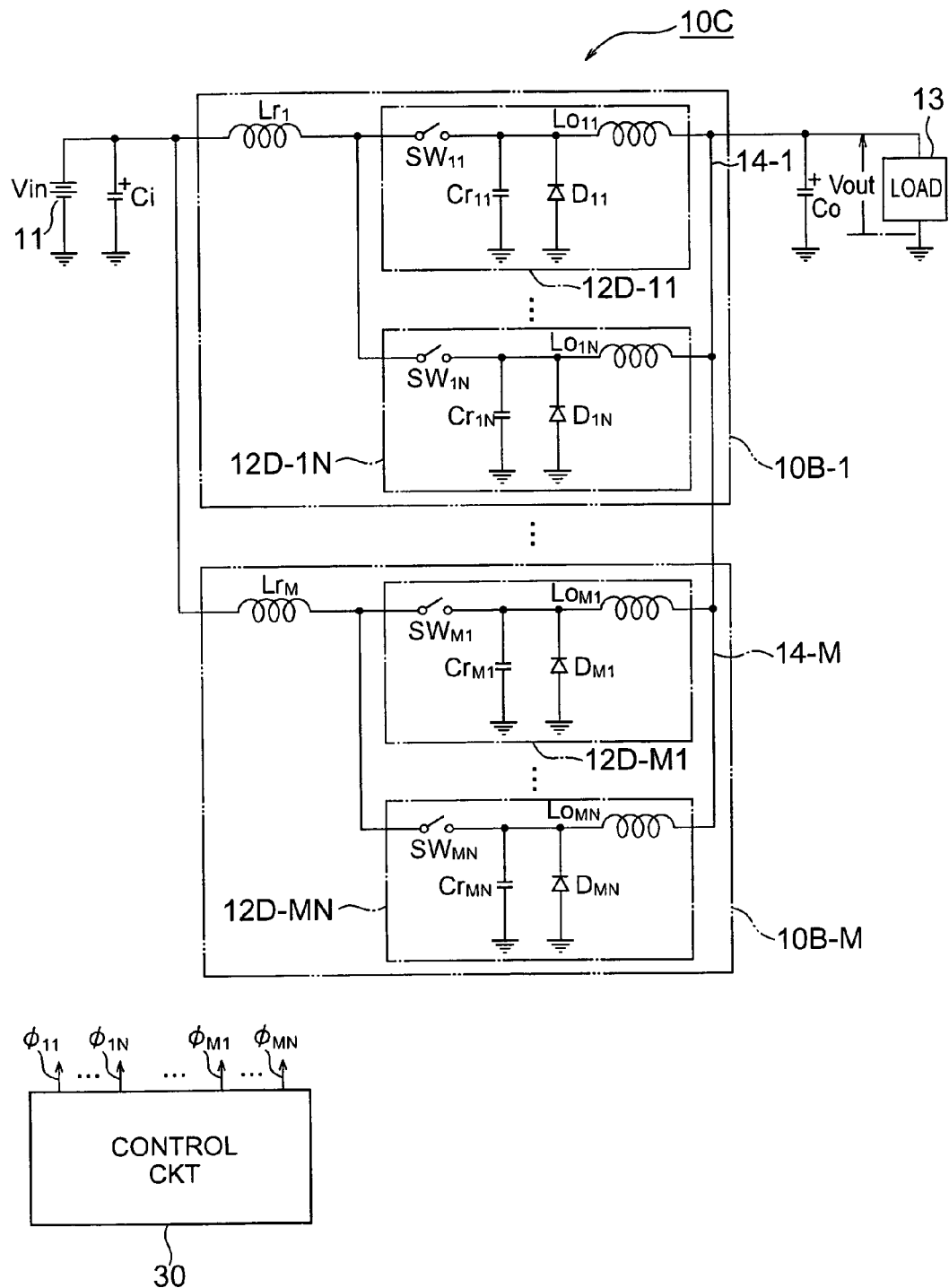
FIG. 10 is a circuit diagram showing structure of a step-down current resonance type multi-phase DC/DC converting apparatus according a first embodiment of this invention.

Referring to FIG. 10, the description will proceed to a current resonance type multi-phase DC/DC converting apparatus 10C according to a first embodiment of this invention. The illustrated current resonance type multi-phase DC/DC converting apparatus 10C comprises M groups of the current resonance type multi-phase DC/DC converters 10B each of which is illustrated in FIG. 7, where M represents a first integer which is not less than two.

More specifically, the current resonance type multi-phase DC/DC converting apparatus 10C is a circuit for generating an output voltage Vout from an input voltage Vin to supply the output voltage Vout to a load 13. An input capacitor Ci is connected in parallel with an input power supply 11. An output capacitor Co is connected in parallel with the load 13. The illustrated current resonance type multi-phase DC/DC converting apparatus 10C is a step-down type. Accordingly, the output voltage Vout is lower than the input voltage Vin.

The step-down current resonance type multi-phase DC/DC converting apparatus 10C comprises first through M-th step-down current resonance type multi-phase DC/DC converters 10B-1 to 10B-M for producing first through M-th converter output voltages in response to the input voltage Vin, the output capacitor Co for combining the first through the M-th converter output voltages to produce the output voltage Vout, and a control circuit 30 for controlling, on the basis of the output voltage Vout, driving of the first through the M-th step-down current resonance type multi-phase DC/DC converters 10B-1 to 10B-M, in the manner which will later be described. In the meanwhile, the first through the M-th step-down current resonance type multi-phase DC/DC converters 10B-1 to 10B-M are called first through M-th groups for short, respectively.

The first step-down current resonance type multi-phase DC/DC converter 10B-1 comprises first through N-th step-down current resonance type DC/DC converters 12D-11, ..., and 12D-1N, and a resonance inductor $Lr_1$ which is shared in the first through the N-th step-down current resonance type DC/DC converters 12D-11 to 12D-1N, where N represents a second integer which is not less than two.

The resonance inductor $Lr_1$ of the first group has an end connected to a positive electrode of the input power supply 11. The resonance inductor $Lr_1$ of the first group has another end connected to input terminals of the first through the N-th step-down current resonance type DC/DC converters 12D-11 to 12D-1N.

In the first group, the first step-down current resonance type DC/DC converter 12D-11 comprises a first energizing switch $SW_{11}$, a first resonance capacitor $Cr_{11}$, a first diode $D_{11}$, and a first output inductor $Lo_{11}$. Likewise, the N-th step-down current resonance type DC/DC converter 12D-1N comprises an N-th energizing switch $SW_{1N}$, an N-th resonance capacitor $Cr_{1N}$, an N-th diode $D_{1N}$, and an N-th output inductor $Lo_{1N}$. Produced by the first through the N-th step-down current resonance type DC/DC converters 12D-11 to 12D-1N, first through N-th switched currents are combined by a signal line 14-1 at which a first converter output voltage is obtained. The first converter output voltage is supplied to the output capacitor Co. The signal line 14-1 serves as a combining arrangement for combining the first through the N-th switched currents to produce the first converter output voltage.

In general, an n-th step-down current resonance type DC/DC converter 12D-11 in the first group comprises an n-th energizing switch $SW_{1n}$, an n-th resonance capacitor $Cr_{1n}$, an n-th diode $D_{1n}$, and an n-th output inductor $Lo_{1n}$. The n-th energizing switch $SW_{1n}$ has an end connected to another end of the resonance inductor $Lr_1$. The n-th energizing switch $SW_{1n}$ has another end which is grounded through the n-th resonance capacitor $Cr_{1n}$. Specifically, the n-th diode $D_{1n}$ has a cathode connected to the other end of the n-th energizing switch $SW_{1n}$. The n-th diode $D_{1n}$ has an anode which is grounded. The n-th output inductor $Lo_{1n}$ has an end connected to the cathode of the n-th diode $D_{1n}$. The n-th output inductor $Lo_{1n}$ has another end connected to an end of the output capacitor Co through the signal line 14-1.

In the first group, a combination of the resonance inductor $Lr_1$ and the n-th resonance capacitor $Cr_{1n}$ constitutes an n-th resonance circuit in the n-th current resonance type DC/DC converter 12D-1n of the first group.

On the other hand, the M-th step-down current resonance type multi-phase DC/DC converter 10B-M comprises first through N-th step-down current resonance type DC/DC converter 12D-M1, ..., and 12D-MN, and a resonance inductor $Lr_M$ which is shared in the first through the N-th step-down current resonance type DC/DC converters 12D-M1 to 12D-MN.

The resonance inductor $Lr_M$ in the M-th group has an end connected to the positive electrode of the input power supply 11. The resonance inductor $Lr_M$ in the M-th group has another end connected to input terminals of the first through the N-th current resonance type DC/DC converters 12D-M1 to 12D-MN.

In the M-th group, the first step-down current resonance type DC/DC converter 12D-M1 comprises a first energizing switch $SW_{M1}$, a first resonance capacitor $Cr_{M1}$, a first diode $D_{M1}$, and a first output inductor $Lo_{M1}$. Similarly, the N-th step-down current resonance type DC/DC converter 12D-MN comprises an N-th energizing switch $SW_{MN}$, an N-th resonance capacitor $Cr_{MN}$, an N-th diode $D_{MN}$, and an N-th output inductor $Lo_{MN}$. Produced by the first through the N-th step-down current resonance type DC/DC converters 12D-M1 to 12D-MN, first through N-th switched currents are combined by a signal line 14-M at which an M-th converter output voltage is obtained. The M-th converter output voltage is supplied to the output capacitor Co. That is, the signal line 14-M serves as an combining arrangement for combining the first through the N-th switched currents to produce the M-th converter output voltage.

In general, an n-th step-down current resonance type DC/DC converter 12D-Mn in the M-th group comprises an n-th energizing switch $SW_{Mn}$, an n-th resonance capacitor $Cr_{Mn}$, an n-th diode $D_{Mn}$, and an n-th output inductor $Lo_{Mn}$, where n represents a variable between 1 and N, both inclusive. The n-th energizing switch $SW_{Mn}$ has an end connected to the other end of the resonance inductor $Lr_M$. The n-th energizing switch $SW_{Mn}$ has another end which is grounded through the n-th resonance capacitor $Cr_{Mn}$. The n-th diode $D_{Mn}$ is connected in parallel with the n-th resonance capacitor $Cr_{Mn}$. Specifically, the n-th diode $D_{Mn}$ has a cathode connected to the other end of the n-th energizing switch $SW_{Mn}$. The n-th diode $D_{Mn}$ has an anode which is grounded. The n-th output inductor $Lo_{Mn}$ has an end connected to the cathode of the n-th diode $D_{Mn}$. The n-th output inductor $Lo_{Mn}$ has another end connected to the end of the output capacitor Co through the signal line 14-M.

In the M-th group, a combination of the resonance inductor $Lr_M$ and the n-th resonance capacitor $Cr_{Mn}$ constitutes an n-th resonance circuit in the n-th step-down current resonance type DC/DC converter 12D-Mn of the M-th group.

In general, an m-th step-down current resonance type multi-phase DC/DC converter 10M-m comprises first through N-th step-down current resonance type DC/DC converter 12D-m1, ..., and 12D-mN, and a resonance inductor $Lr_m$ which is shared in the first through the N-th step-down current resonance type DC/DC converter 12D-m1 to 12D-mN, where m represents a variable between 1 to M, both inclusive.

The resonance inductor $Lr_m$ of the m-th group has an end connected to the positive electrode of the input power supply 11. The resonance inductor $Lr_m$ of the m-th group has another end connected to input terminals of the first through the N-th step-down current resonance type DC/DC converters 12D-m1 to 12D-mN.

In the m-th group, the first step-down current resonance type DC/DC converter 12D-m1 comprises a first energizing switch $SW_{m1}$, a first resonance capacitor $Cr_{m1}$, a first diode $D_{m1}$, and a first output inductor $Lo_{m1}$. Similarly, the N-th step-down current resonance type DC/DC converter 12D-mN comprises an N-th energizing switch $SW_{mN}$, an N-th resonance capacitor $Cr_{mN}$, an N-th diode $D_{mN}$, and an N-th output inductor $Lo_{mN}$. Produced by the first through the N-th step-down current resonance type DC/DC converters 12D-m1 to 12mN, first through N-th switched currents are combined by a signal line 14-m at which an m-th converter output voltage is obtained. That is, the signal line 14-m serves as a combining arrangement for combining the first through the N-th switched currents to produce the m-th converter output voltage.

In general, an n-th step-down current resonance type DC/DC converter 12D-mn in the m-th group comprises an n-th energizing switch $SW_{mn}$, an n-th resonance capacitor $Cr_{mn}$, an n-th diode $D_{mn}$, and an n-th output inductor $Lo_{mn}$, where n represents a variable between 1 and N, both inclusive. The n-th energizing switch $SW_{mn}$ has an end connected to the other end of the resonance inductor $Lr_m$. The n-th energizing switch $SW_{mn}$ has another end which is grounded through the n-th resonance capacitor $Cr_{mn}$. The n-th diode $D_{mn}$ is connected in parallel with the n-th resonance capacitor $Cr_{mn}$. Specifically, the n-th diode $D_{mn}$ has a cathode connected to the other end of the n-th energizing switch $SW_{mn}$. The n-th diode $D_{mn}$ has an anode which is grounded. The output inductor $Lo_{mn}$ has an end connected to the cathode of the n-th diode $D_{mn}$. The output inductor $Lo_{mn}$ has another end connected to the end of the output capacitor Co through the signal line 14-m.

In the m-th group, a combination of the resonance inductor $Lr_m$ and the n-th resonance capacitor $Cr_{mn}$ constitutes an n-th resonance circuit in the n-th current resonance type DC/DC converter 12D-mn of the m-th group.

Turning on/off of the first through the N-th energizing switches $SW_{11}$ to $SW_{1N}$ of the first group through the first through the N-th energizing switches $SW_{M1}$ to $SW_{MN}$ of the M-th group is controlled by first through N-th control signals $\phi_{11}$ to $\phi_{1N}$ of the first group through first through N-th control signals $\phi_{M1}$ to $\phi_{MN}$ supplied from the control circuit 30. The control circuit 30 is supplied with the output voltage Vout. In addition, the control circuit 30 is supplied with first through M-th current detected signals from first through M-th current detectors (not shown) for detecting currents $I_{Lr1}$ to $I_{LrM}$ flowing through the resonance inductors $Lr_1$ to $Lr_M$ of the first through the M-th groups. The first through the N-th control signals $\phi_{11}$ to $\phi_{1N}$ of the first group through the first through the N-th control signals $\phi_{M1}$ to $\phi_{MN}$ of the M-th group have the same switching frequency and different phases which are shifted to one another.

In each of the first through the M-th groups, the first through the N-th control signals $\phi_{m1}$ to $\phi_{mN}$ desirably have the different phases which are shifted to one another by 360/N degrees.

In addition, M n-th control signals $\phi_{1n}$ to $\phi_{Mn}$ in the first though the M-th groups desirably have the different phases which are shifted to one anther by 360/(N·N) degrees.

For a duration where it is unnecessary to flow the current $I_{Lrm}$ through the resonance inductor $Lr_m$ after a resonance duration in a k-th resonance circuit (the resonance inductor $Lr_m$ and a k-th resonance capacitor $Cr_{mk}$) of a k-th step-down current resonance type DC/DC converter 12D-mk of the m-th group, where k represents a variable between 1 and N, both inclusive, the control circuit 30 turns on an (k+1)-th energizing switch $SW_{m(k+1)}$ of a (k+1)-th step-down current resonance type DC/DC converter 12D-m(k+1) which should be subsequently driven (where (k+1) is equal to 1 when k is equal to N) and uses the resonance inductor $Lr_m$ as a (k+1)-th resonance inductor in an (k+1)-th resonance circuit of the (k+1)-th step-down current resonance type DC/DC converter 12D-m(k+1).

Figure 11:
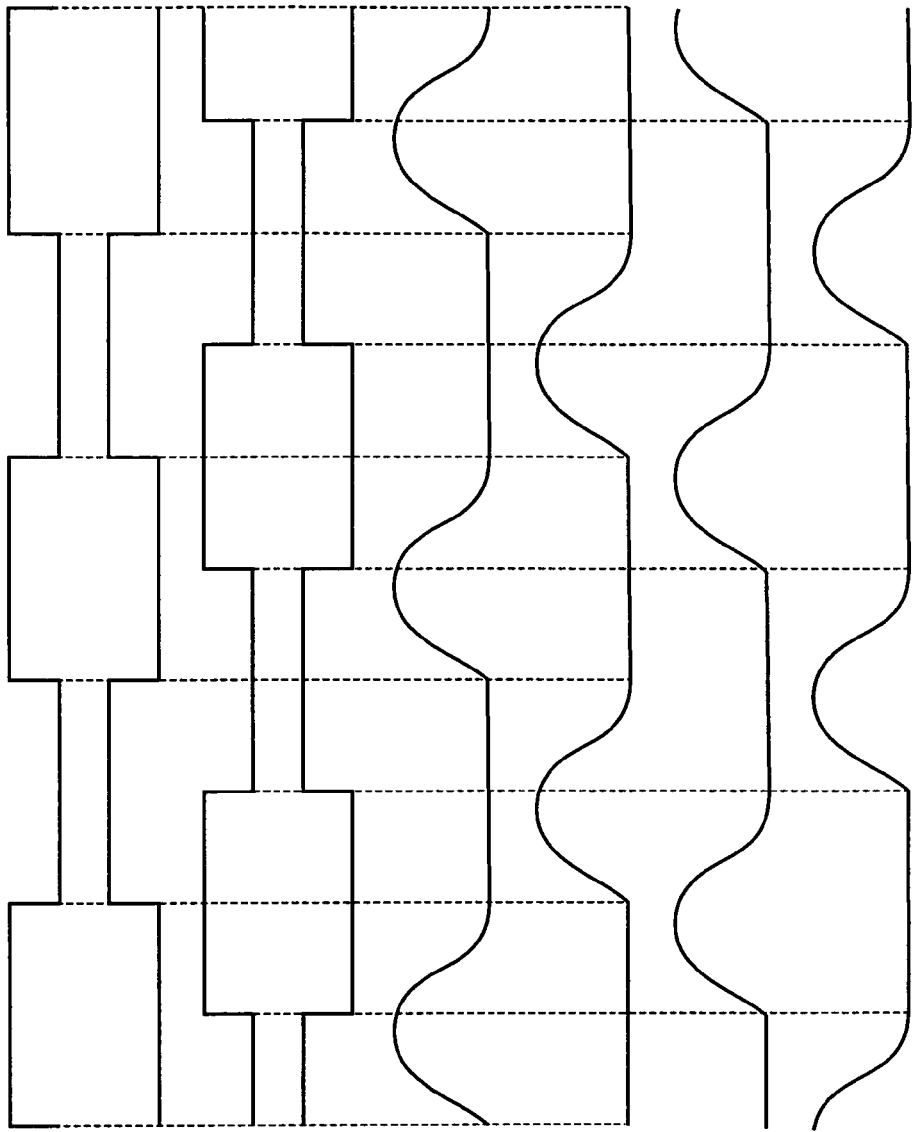
FIGS. 11A through 11H show waveforms for use in describing operation of the step-down current resonance type multi-phase DC/DC converting apparatus illustrated in FIG. 10 in a case where N=2 and M=2.

Referring to FIGS. 11A through 11H, description will be made as regards operation of the step-down current resonance type multi-phase DC/DC converting apparatus 10C illustrated in FIG. 10. The illustrated example shows a case where Vout=Vin/2, N=2, and M=2. FIG. 11A shows an ON/OFF state of the first energizing switch $SW_{11}$ of the first group. FIG. 11B shows an ON/OFF state of the second energizing switch $SW_{12}$ of the first group. FIG. 11C shows the first energizing switch $SW_{21}$ of the second group. FIG. 11D shows the second energizing switch $SW_{22}$ of the second group. FIG. 11E shows a current $I_{SW11}$ flowing through the first energizing switch $SW_{11}$ of the first group. FIG. 11F shows a current $I_{SW12}$ flowing through the second energizing switch $SW_{12}$ of the first group. FIG. 11G shows a current $I_{SW21}$ flowing through the first energizing switch $SW_{21}$ of the second group. FIG. 11H shows a current $I_{SW22}$ flowing through the second energizing switch $SW_{22}$ of the second group.

The control circuit 30 controls the first energizing switch $SW_{11}$ and the second energizing switch $SW_{12}$ in the first group so as to shift the phases to each other by 180 degrees. Likewise, the control circuit 30 controls the first energizing switch $SW_{21}$ and the second energizing switch $SW_{22}$ in the second group so as to shift the phases to each other by 180 degrees. In addition, the control circuit 30 controls the first energizing switch $SW_{11}$ of the first group and the first energizing switch $SW_{21}$ of the second group so as to shift the phases to each other by 90 degrees and controls the second energizing switch $SW_{12}$ of the first group and the second energizing switch $SW_{22}$ of the second group so as to shift the phases to each other by 90 degrees. That is, it is understood that, for example, the first energizing switch $SW_{11}$ of the first group and the first energizing switch $SW_{21}$ of the second group have ON time intervals which overlap with each other, as shown in FIGS. 11A and 11C.

In the manner which is described above, the step-down current resonance type multi-phase DC/DC converting apparatus 10C according to the first embodiment of this invention has a large capacity because there is no limitation for multiple phase. In addition, it is possible to keep ripples of the output voltage Vout small. This is because the energizing switches $SW_{11}$ to $SW_{1N}$, ..., and $SW_{M1}$ to $SW_{MN}$ are switched with those phases shifted.

In addition, as the energizing switches $SW_{11}$ to $SW_{1N}$, ..., and $SW_{M1}$ to $SW_{MN}$, metal oxide semiconductor field effect transistors (MOSFETs), bipolar transistors, or junction FETs may be used.

Although the current resonance type multi-phase DC/DC converting apparatus 10C illustrated in FIG. 10 is the step-down type, this invention is not restricted to the step-down type and may be applied to a step-up type or a polarity reversing type.

Figure 12:
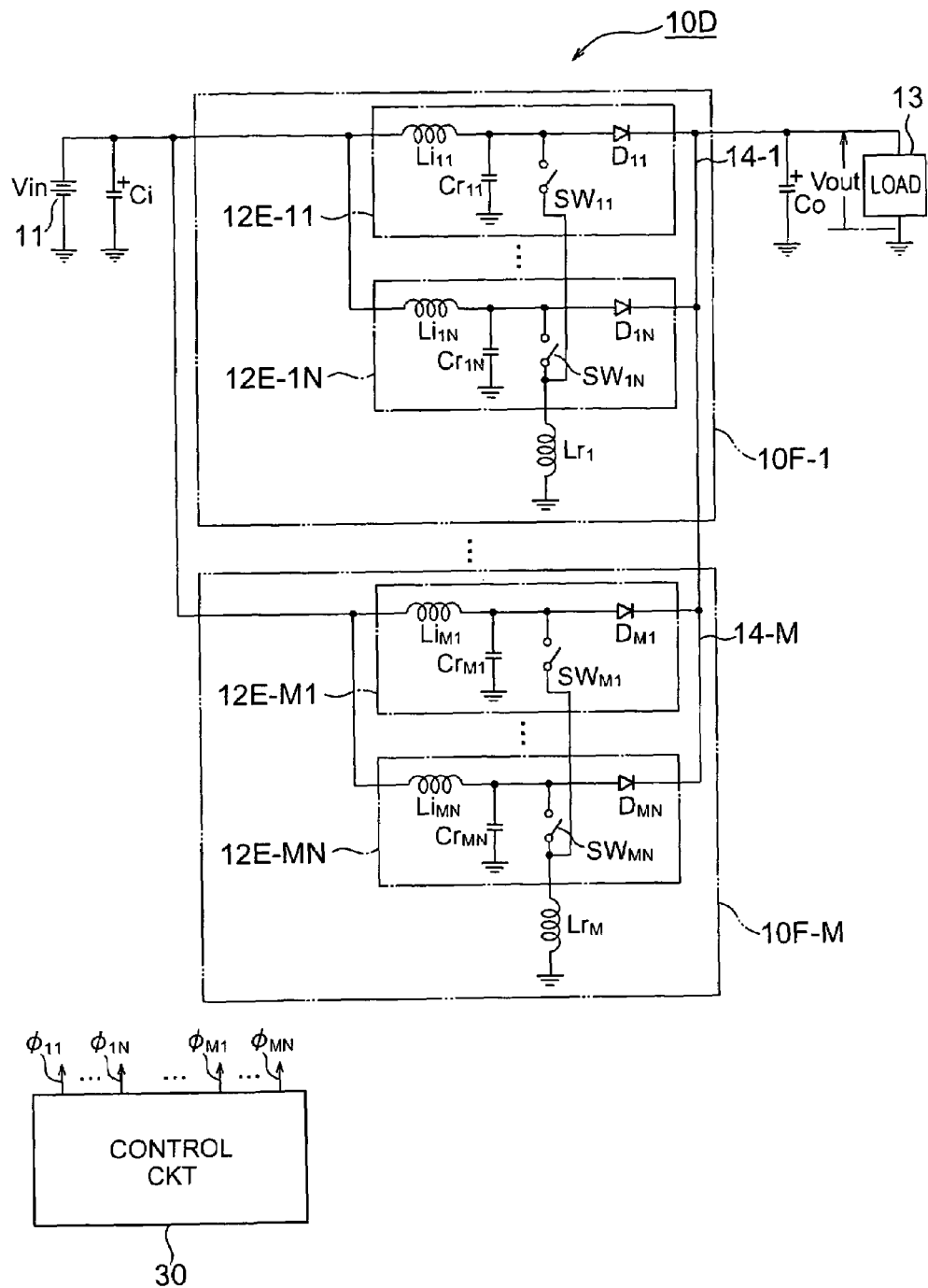
FIG. 12 is a circuit diagram showing structure of a step-up current resonance type multi-phase DC/DC converting apparatus according a second embodiment of this invention.

Referring to FIG. 12, the description will proceed to a current resonance type multi-phase DC/DC converting apparatus 10D according to a second embodiment of this invention. The illustrated current resonance type multi-phase DC/DC converting apparatus 10D is a step-up type and comprises M groups of step-up current resonance type multiphase DC/DC converters which will later be described, where M represents a first integer which is not less than two.

More specifically, the step-up current resonance type multi-phase DC/DC converting apparatus 10D is a circuit for generating an output voltage Vout from an input voltage Vin to supply the output voltage Vout to a load 13. An input capacitor Ci is connected in parallel with an input power supply 11. An output capacitor Co is connected in parallel with the load 13. Inasmuch as the illustrated current resonance type multiphase DC/DC converting apparatus 10D is the step-up type, the output voltage Vout is higher than the input voltage Vin.

The step-up current resonance type multi-phase DC/DC converting apparatus 10D comprises first through M-th step-up current resonance type multi-phase DC/DC converters 10F-1 to 10F-M which are independently controlled to one another and which produce first through M-th converter output voltages, respectively, the output capacitor Co for combining the first through the M-th converter output voltages to produce the output voltage Vout, and a control circuit 30 for controlling, on the basis of the output voltage Vout, driving of the first through the M-th step-up current resonance type multi-phase DC/DC converters 10F-1 to 10F-N in the manner which will later be described. The first through the M-th step-up current resonance type multi-phase DC/DC converters 10F-1 to 10F-M are also called first through M-th groups for short, respectively.

The first step-up current resonance type multi-phase DC/DC converter 10F-1 comprises first through N-th step-up current resonance type DC/DC converters 12E-11, . . . , and 12E-1N, and a resonance inductor $Lr_1$ which is shared in the first through the N-th step-up current resonance type DC/DC converters 12E-11 to 12E-1N, where N represents a second integer which is not less than two.

In the first group, the first step-up current resonance type DC/DC converter 12E-11 comprises a first input inductor $Li_{11}$, a first energizing switch $SW_{11}$, a first resonance capacitor $Cr_{11}$, and a first diode $D_{11}$. Similarly, the N-th step-up current resonance type DC/DC converter 12E-1N comprises an N-th input inductor $Li_{1N}$, an N-th energizing switch $SW_{1N}$, an N-th resonance capacitor $Cr_{1N}$, and an N-th diode $D_{1N}$. Produced by the first through the N-th step-up current resonance type DC/DC converters 12E-11 to 12E-1N, first through N-th switched currents are combined by a signal line 14-1 at which the first converter output voltage is obtained. The first converter output voltage is supplied to the output capacitor Co. That is, the signal line 14-1 serves as a combining arrangement for combining the first through the N-th switched currents to produce the first converter output voltage.

In general, an n-th step-up current resonance type DC/DC converter 12E-1n comprises an n-th input inductor $Li_{1n}$, an n-th energizing switch $SW_{1n}$, an n-th resonance capacitor $Cr_{1n}$, and an n-th diode Din, where n represents a variable between 1 and N, both inclusive. The n-th input inductor $Li_{1n}$ has an end connected to a positive electrode of the input power supply 11. The n-th input inductor $Li_{1n}$ has another end which is grounded through the n-th resonance capacitor $Cr_{1n}$. In addition, the other end of the n-th input inductor $Li_{1n}$ is connected to an end of the n-th energizing switch $SW_{1n}$. The n-th energizing switch $SW_{1n}$ has another end which is grounded through a resonance inductor $Lr_1$. Furthermore, the other end of the input inductor $Li_{1n}$ is connected to an anode of the n-th diode $D_{1n}$. The n-th diode $D_{1n}$ has a cathode connected to an end of the output capacitor Co through the signal line 14-1.

In the first group, a combination of the resonance inductor $Lr_1$ and the n-th resonance capacitor $Cr_{1n}$ constitutes an n-th resonance circuit in the n-th step-up current resonance type DC/DC converter 12E-1n of the first group.

On the other hand, the M-th step-up current resonance type multi-phase DC/DC converter 10F-M comprises first through N-th step-up current resonance type DC/DC converters 12E-M1, . . . , and 12E-MN, and a resonance inductor $Lr_M$ which is shared in the first through the N-th step-up current resonance type DC/DC converters 12E-M1 to 12E-MN.

In the M-th group, the first step-up current resonance type DC/DC converter 12E-M1 comprises a first input inductor $Li_{M1}$, a first energizing switch $SW_{M1}$, a first resonance capacitor $Cr_{M1}$, and a first diode $D_{M1}$. Likewise, the N-th step-up current resonance type DC/DC converter 12E-MN comprises an N-th input inductor LIMN, an N-th energizing switch $SW_{MN}$, an N-th resonance capacitor $Cr_{MN}$, and an N-th diode $D_{MN}$. Produced by the first through the N-th step-up current resonance type DC/DC converters 12E-M1 to 12E-MN, first through N-th switched currents are combined by a signal line 14-M at which the M-th converter output voltage is obtained. The M-th converter output voltage is supplied to the output capacitor Co. That is, the signal line 14-M serves as a combining arrangement for combining the first through the N-th switched currents to produce the M-th converter output voltage.

In general, an n-th step-up current resonance type DC/DC converter 12E-Mn in the M-th group comprises an n-th input inductor $Li_{Mn}$, an n-th energizing switch $SW_{Mn}$, an n-th resonance capacitor $Cr_{Mn}$, and an n-th diode $D_{Mn}$. The n-th input inductor $Li_{Mn}$ has an end connected to the positive electrode of the input power supply 11. The n-th input inductor $Li_{Mn}$ has another end which is grounded through the n-th resonance capacitor $Cr_{Mn}$. In addition, the other end of the n-th input inductor $Li_{Mn}$ is connected to an end of the n-th energizing switch $SW_{Mn}$. The n-th energizing switch $SW_{Mn}$ has another end which is grounded through the resonance inductor $Lr_M$. Furthermore, the other end of the input inductor $Li_{Mn}$ is connected to an anode of the n-th diode $D_{Mn}$. The n-th diode $D_{Mn}$ has a cathode connected to the end of the output capacitor Co through the signal line 14-M.

In the M-th group, a combination of the resonance inductor $Lr_M$ and the n-th resonance capacitor $Cr_{Mn}$ constitutes an n-th resonance circuit in the n-th step-up current resonance type DC/DC converter 12E-Mn of the M-th group.

In general, an m-th step-up current resonance type multiphase DC/DC converter 10F-m comprises first through N-th step-up current resonance type DC/DC converters 12E-m1, . . . , and 12E-mN, and a resonance inductor $Lr_m$ which is shared in the first through the N-th step-up current resonance type DC/DC converters 12E-m1 to 12E-mN, where m represents a variable between 1 and M, both inclusive.

In the m-th group, the first step-up current resonance type DC/DC converter 12E-m1 comprises a first input inductor $Li_{m1}$, a first energizing switch $SW_{m1}$, a first resonance capacitor $Cr_{m1}$, and a first diode $D_{m1}$. Likewise, the N-th step-up current resonance type DC/DC converter 12E-mN comprises an N-th input inductor $Li_{mN}$, an N-th energizing switch $SW_{mN}$, an N-th resonance capacitor $Cr_{mN}$, and an N-th diode $D_{mN}$. Produced by the first through the N-th step-up current resonance type DC/DC converters 12E-m1 to 12E-mN, first through N-th switched currents are combined by a signal line 14-m at which the m-th converter output voltage is obtained. The m-th converter output voltage is supplied to the output capacitor Co. That is, the signal line 14-m serves as a combining arrangement for combining the first through the N-th switched currents to produce the m-th converter output voltage.

In general, an n-th step-up current resonance type DC/DC converter 12E-mn in the m-th group comprises an n-th input inductor $Li_{mn}$, an n-th energizing switch $SW_{mn}$, an n-th resonance capacitor $Cr_{mn}$, and an n-th diode $D_{mn}$. The n-th input inductor $Li_{mn}$ has an end connected to the positive electrode of the input power supply 11. The n-th input inductor $Li_{mn}$ has another end which is grounded through the n-th resonance capacitor $Cr_{mn}$. In addition, the other end of the n-th input inductor $Li_{mn}$ is connected to an end of the n-th energizing switch $SW_{mn}$. The n-th energizing switch $SW_{mn}$ has another end which is grounded through a resonance inductor $Lr_m$. Furthermore, the other end of the n-th input inductor $Li_{mn}$ is connected to an anode of the n-th diode $D_{mn}$. The n-th diode $D_{mn}$ has a cathode connected to the end of the output capacitor Co through the signal line 14-m.

In the m-th group, a combination of the resonance inductor $Lr_m$ and the n-th resonance capacitor $Cr_{mn}$ constitutes an n-th resonance circuit in the n-th step-up current resonance type DC/DC converter 12E-mn of the m-th group.

Turning on/off of the first through the N-th energizing switches $SW_{11}$ to $SW_{1N}$ of the first group through the first through the N-th energizing switches $SW_{M1}$ fo $SW_{MN}$ of the M-th group is controlled by first through N-th control signals $\phi_{11}$ to $\phi_{1N}$ of the first group through first through N-th control signals $\phi_{M1}$ to $\phi_{MN}$ supplied from the control circuit 30. The control circuit 30 is supplied with the output voltage Vout. In addition, the control circuit 30 is supplied with first through M-th current detected signals from first through M-th current detectors (not shown) for detecting currents $I_{Lr1}$ to $I_{LrM}$ flowing through the resonance inductors $Lr_1$ to $Lr_M$ of the first through the M-th groups. The first through the N-th control signals $\phi_{11}$ to $\phi_{1N}$ of the first group through the first through the N-th control signals $\phi_{M1}$ to $\phi_{MN}$ of the M-th group have the same switching frequency and different phases which are shifted to one another in the manner which will later be described.

In each of the first through the M-th groups, the first through the M-th energizing switches $SW_{m1}$ to $SW_{mN}$ (the first through the M-th control signals $\phi_{m1}$ to $\phi_{mN}$) desirably have the different phases which are shifted to one another by 360/N degrees.

In addition, M n-th energizing switches $SW_{1n}$ to $SW_{Mn}$ (M n-th control signals $\phi_{1n}$ to $\phi_{Mn}$) in the first through the M-th groups desirably have the different phases which are shifted to one another by 360/(N·M) degrees.

For a duration where it is unnecessary to flow the current $I_{Lrm}$ through the resonance inductor $Lr_m$ after a resonance duration in a k-th resonance circuit (the resonance inductor $Lr_m$ and a k-th resonance capacitor $Cr_{mk}$) of a k-th step-up current resonance type DC/DC converter 12E-mk of the m-th group, where k represents a variable between 1 and N, both inclusive, the control circuit 30 turns on an (k+1)-th energizing switch $SW_{m(k+1)}$ of a (k+1)-th step-up current resonance type DC/DC converter 12E-m(k+1) which should be subsequently driven (where (k+1) is equal to 1 when k is equal to N) and uses the resonance inductor $Lr_m$ as a (k+1)-th resonance inductor in an (k+1)-th resonance circuit of the (k+1)-th step-up current resonance type DC/DC converter 12E-m(k+1).

Figure 13:
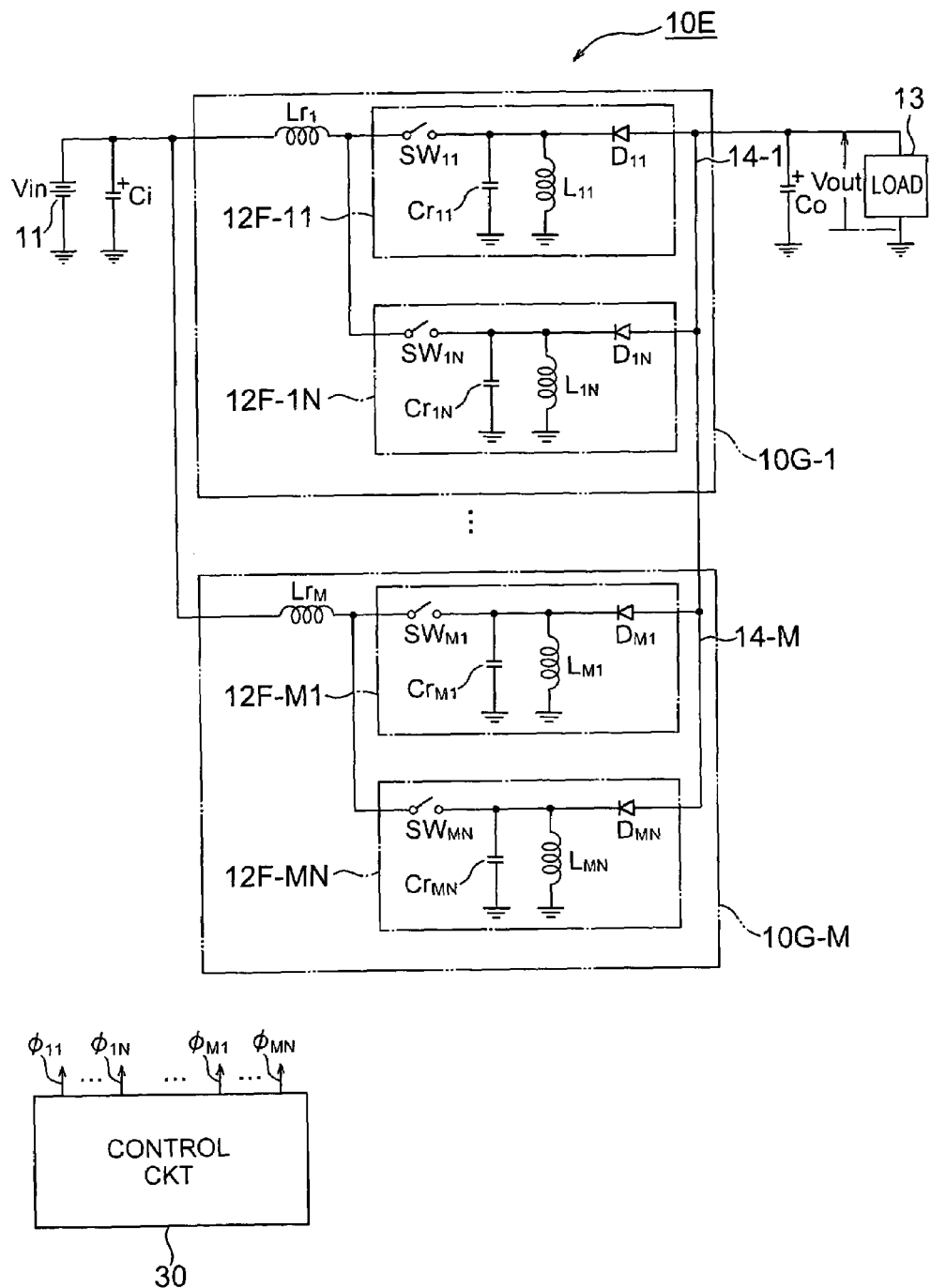
FIG. 13 is a circuit diagram showing structure of a polarity reversing current resonance type multi-phase DC/DC converting apparatus according a third embodiment of this invention.

Referring to FIG. 13, the description will proceed to a current resonance type multi-phase DC/DC converting apparatus 10E according to a third embodiment of this invention. The illustrated current resonance type multi-phase DC/DC converting apparatus 10E is a polarity reversing type and comprises M polarity reversing current resonance type multi-phase DC/DC converters which will later be described, where M represents a first integer which is not less than two.

More specifically, the polarity reversing current resonance type multi-phase DC/DC converting apparatus 10E is a circuit for generating an output voltage Vout from an input voltage Vin to supply the output voltage Vout to a load 13. An input capacitor Ci is connected in parallel with an input power supply 11. An output capacitor Co is connected in parallel with the load 13. Inasmuch as the illustrated current resonance type multi-phase DC/DC converting apparatus 10E is the polarity reversing type, the output voltage Vout is a negative voltage where polarity of the input voltage Vin is reversed.

The polarity reversing current resonance type multi-phase DC/DC converting apparatus 10E comprises first through M-th polarity reversing current resonance type multi-phase DC/DC converters 10G-1 to 10G-M which are independently controlled to one another and which produce first through M-th converter output voltages, respectively, the output capacitor Co for combining the first through the M-th converter output voltages to produce the output voltage Vout, and a control circuit 30 for controlling, on the basis of the output voltage Vout, driving of the first through the M-th polarity reversing current resonance type multi-phase DC/DC converters 10G-1 to 10G-N in the manner which will later be described. The first through the M-th polarity reversing current resonance type multi-phase DC/DC converters 10G-1 to 10G-M are also called first through M-th groups for short, respectively.

The first polarity reversing current resonance type multi-phase DC/DC converter 10G-1 comprises first through N-th polarity reversing current resonance type DC/DC converters 12F-11, . . . , and 12F-1N, and a resonance inductor $Lr_1$ which is shared in the first through the N-th polarity reversing current resonance type DC/DC converters 12F-11 to 12F-1N, where N represents a second integer which is not less than two.

The resonance inductor $Lr_1$ of the first group has an end connected to a positive electrode of the input power supply 11. The resonance inductor $Lr_1$ of the first group has another end connected to input terminals of the first through the N-th polarity reversing current resonance type DC/DC converters 12F-11 to 12F-1N.

In the first group, the first polarity reversing current resonance type DC/DC converter 12F-11 comprises a first energizing switch $SW_{11}$, a first resonance capacitor $Cr_{11}$, a first inductor $L_{11}$, and a first diode $D_{11}$. Similarly, the N-th polarity reversing current resonance type DC/DC converter 12F-1N comprises an N-th energizing switch $SW_{1N}$, an N-th resonance capacitor $Cr_{1N}$, an N-th inductor $L_{1N}$, and an N-th diode $D_{1N}$. Produced by the first through the N-th polarity reversing current resonance type DC/DC converters 12F-11 to 12F-1N, first through N-th switched currents are combined by a signal line 14-1 at which the first converter output voltage is obtained. The first converter output voltage is supplied to the output capacitor Co. That is, the signal line 14-1 serves as a combining arrangement for combining the first through the N-th switched currents to produce the first converter output voltage.

In general, an n-th polarity reversing current resonance type DC/DC converter 12F-1n comprises an n-th energizing switch $SW_{1n}$, an n-th resonance capacitor $Cr_{1n}$, and an n-th inductor $L_{1n}$, an n-th diode $D_{1n}$, where n represents a variable between 1 and N, both inclusive. The n-th energizing switch $SW_{1n}$ has an end connected to the other end of the resonance inductor $Lr_1$. The n-th energizing switch $SW_{1n}$ has another end which is grounded through the n-th resonance capacitor $Cr_{1n}$. The n-th inductor $L_{1n}$ is connected in parallel with the n-th resonance capacitor $Cr_{1n}$. In addition, the other end of the n-th energizing switch $SW_{1n}$ is connected to a cathode of the n-th diode Din. The n-th diode Din has an anode connected to an end of the output capacitor Co through the signal line 14-1.

In the first group, a combination of the resonance inductor $Lr_1$ and the n-th resonance capacitor $Cr_{1n}$ constitutes an n-th resonance circuit in the n-th polarity reversing current resonance type DC/DC converter 12F-1n of the first group.

On the other hand, the M-th polarity reversing current resonance type multi-phase DC/DC converter 10G-M comprises first through N-th polarity reversing current resonance type DC/DC converters 12F-M1, ..., and 12F-MN, and a resonance inductor $Lr_M$ which is shared in the first through the N-th polarity reversing current resonance type DC/DC converters 12F-M1 to 12F-MN.

The resonance inductor $Lr_M$ of the M-th group has an end connected to the positive electrode of the input power supply 11. The resonance inductor $Lr_M$ of the M-th group has another end connected to input terminals of the first through the N-th polarity reversing current resonance type DC/DC converters 12F-M1, ..., and 12F-MN.

In the M-th group, the first polarity reversing current resonance type DC/DC converter 12F-M1 comprises a first energizing switch $SW_{M1}$, a first resonance capacitor $Cr_{M1}$, a first inductor $L_{M1}$, and a first diode $D_{M1}$. Likewise, the N-th polarity reversing current resonance type DC/DC converter 12F-MN comprises an N-th energizing switch $SW_{MN}$, an N-th resonance capacitor $Cr_{MN}$, an N-th inductor $L_{MN}$, and an N-th diode $D_{MN}$. Produced by the first through the N-th polarity reversing current resonance type DC/DC converters 12F-M1 to 12F-MN, first through N-th switched currents are combined by a signal line 14-M at which the M-th converter output voltage is obtained. The M-th converter output voltage is supplied to the output capacitor Co. That is, the signal line 14-M serves as a combining arrangement for combining the first through the N-th switched currents to produce the M-th converter output voltage.

In general, an n-th polarity reversing current resonance type DC/DC converter 12F-Mn in the M-th group comprises an n-th energizing switch $SW_{Mn}$, an n-th resonance capacitor $Cr_{Mn}$, an n-th inductor $L_{Mn}$, and an n-th diode $D_{Mn}$. The n-th energizing switch $SW_{Mn}$ has an end connected to the other end of the resonance inductor $Lr_M$. The n-th energizing switch $SW_{Mn}$ has another end which is grounded through the n-th resonance capacitor $Cr_{Mn}$. The n-th inductor $L_{Mn}$ is connected in parallel with the n-th resonance capacitor $Cr_{Mn}$. In addition, the other end of the n-th energizing switch $SW_{Mn}$ is connected to a cathode of the n-th diode $D_{Mn}$. The n-th diode $D_{Mn}$ has an anode connected to the end of the output capacitor Co through the signal line 14-M.

In the M-th group, a combination of the resonance inductor $Lr_M$ and the n-th resonance capacitor $Cr_{Mn}$ constitutes an n-th resonance circuit in the n-th polarity reversing current resonance type DC/DC converter 12F-Mn of the M-th group.

In general, an m-th polarity reversing current resonance type multi-phase DC/DC converter 10G-m comprises first through N-th polarity reversing current resonance type DC/DC converters 12F-m1, ..., and 12F-mN, and a resonance inductor $Lr_m$ which is shared in the first through the N-th polarity reversing current resonance type DC/DC converters 12F-m1 to 12F-mN, where m represents a variable between 1 and M, both inclusive.

The resonance inductor $Lr_m$ of the m-th group has an end connected to the positive electrode of the input power supply 11. The resonance inductor $Lr_m$ of the m-th group has another end connected to the input terminals of the through the N-th polarity reversing current resonance type DC/DC converters 12F-m1 to 12F-mN.

In the m-th group, the first polarity reversing current resonance type DC/DC converter 12F-m1 comprises a first energizing switch $SW_{m1}$, a first resonance capacitor $Cr_{m1}$, a first inductor $L_{m1}$, and a first diode $D_{m1}$. Likewise, the N-th polarity reversing current resonance type DC/DC converter 12F-mN comprises an N-th energizing switch $SW_{mN}$, an N-th resonance capacitor $Cr_{mN}$, an N-th inductor $L_{mN}$, and an N-th diode $D_{mN}$. Produced by the first through the N-th polarity reversing current resonance type DC/DC converters 12F-m1 to 12F-mN, first through N-th switched currents are combined by a signal line 14-m at which the m-th converter output voltage is obtained. The m-th converter output voltage is supplied to the output capacitor Co. That is, the signal line 14-m serves as a combining arrangement for combining the first through the N-th switched currents to produce the m-th converter output voltage.

In general, an n-th polarity reversing current resonance type DC/DC converter 12F-mn in the m-th group comprises an n-th energizing switch $SW_{mn}$, an n-th resonance capacitor $Cr_{mn}$, an n-th inductor $L_{mn}$, and an n-th diode $D_{mn}$. The n-th energizing switch $SW_{mn}$ has an end connected to the resonance inductor $Lr_m$. The n-th energizing switch $SW_{mn}$ has another end which is grounded through the n-th resonance capacitor $Cr_{mn}$. The n-th inductor $L_{mn}$ is connected in parallel with the n-th resonance capacitor $Cr_{mn}$. In addition, the other end of the n-th energizing switch $SW_{mn}$ has another end connected to a cathode of the n-th diode $D_{mn}$. The n-th diode $D_{mn}$ has an anode connected to the end of the output capacitor Co through the signal line 14-m.

In the m-th group, a combination of the resonance inductor $Lr_m$ and the n-th resonance capacitor $Cr_{mn}$ constitutes an n-th resonance circuit in the n-th polarity resonance current resonance type DC/DC converter 12F-mn of the m-th group.

Turning on/off of the first through the N-th energizing switches $SW_{11}$ to $SW_{1N}$ of the first group through the first through the N-th energizing switches $SW_{M1}$ fo $SW_{MN}$ of the M-th group is controlled by first through N-th control signals $\phi_{11}$ to $\phi_{1N}$ of the first group through first through N-th control signals $\phi_{M1}$ to $\phi_{MN}$ supplied from the control circuit 30. The control circuit 30 is supplied with the output voltage Vout. In addition, the control circuit 30 is supplied with first through M-th current detected signals from first through M-th current detectors (not shown) for detecting currents $I_{Lr1}$ to $I_{LrM}$ flowing through the resonance inductors $Lr_1$ to $Lr_M$ of the first through the M-th groups. The first through the N-th control signals $\phi_{11}$ to $\phi_{1N}$ of the first group through the first through the N-th control signals $\phi_{M1}$ to $\phi_{MN}$ of the M-th group have the same switching frequency and different phases which are shifted to one another in the manner which will later be described.

In each of the first through the M-th groups, the first through the N-th energizing switches $SW_{m1}$ to $SW_{mN}$ (the first through the N-th control signals $\phi_{m1}$ to $\phi_{mN}$) desirably have the different phases which are shifted to one another by 360/N degrees.

In addition, M n-th energizing switches $SW_{1n}$ to $SW_{Mn}$ (M n-th control signals $\phi_{1n}$ to $\phi_{Mn}$) in the first through the M-th groups desirably have the different phases which are shifted to one another by 360/(N·M) degrees.

For a duration where it is unnecessary to flow the current $I_{Lrm}$ in the resonance inductor $Lr_m$ after a resonance duration in a k-th resonance circuit (the resonance inductor $Lr_m$ and a k-th resonance capacitor $Cr_{mk}$) of a k-th polarity reversing current resonance type DC/DC converter 12F-mk of the m-th group, where k represents a variable between 1 and N, both inclusive, the control circuit 30 turns on an (k+1)-th energizing switch $SW_{m(k+1)}$ of a (k+1)-th polarity reversing current resonance type DC/DC converter 12F-m(k+1) which should be subsequently driven (where (k+1) is equal to 1 when k is equal to N) and uses the resonance inductor $Lr_m$ as a (k+1)-th resonance inductor in a (k+1)-th resonance circuit of the (k+1)-th polarity reversing current resonance type DC/DC converter 12F-m(k+1).

While this invention has thus far been described in conjunction with several preferred embodiments thereof, it will now readily possible for those skilled in the art to put this invention into various manners.

What is claimed is:

1. A current resonance multi-phase DC/DC converting apparatus comprising:
   M current resonance multi-phase DC/DC converters connected in parallel with one another, where M represents a first integer which is not less than two, said M current resonance multi-phase DC/DC converters producing M converter output voltages in response to an input voltage,
   an output capacitor for combining said M converter output voltages to produce an output voltage,
   wherein each of said M current resonance multi-phase DC/DC converters comprises:
      N current resonance DC/DC converters which are connected in parallel with one another, where N represents a second integer which is not less than two, and said N current resonance DC/DC converters including N resonance circuits, respectively, and
   wherein each of said M current resonance multi-phase DC/DC converters shares a resonance inductor of said N resonance circuits.

2. The current resonance multi-phase DC/DC converting as claimed in claim 1, wherein each of said M current resonance multi-phase DC/DC converters comprises a step-down current resonance multi-phase DC/DC converter.

3. The current resonance multi-phase DC/DC converting apparatus as claimed in claim 1, wherein each of said M current resonance multi-phase DC/DC converters comprises a step-up current resonance multi-phase DC/DC converter.

4. The current resonance multi-phase DC/DC converting apparatus as claimed in claim 1, wherein each of said M current resonance multi-phase DC/DC converters comprises a polarity reversing current resonance multi-phase DC/DC converter.

5. A method of controlling a current resonance multi-phase DC/DC converting apparatus comprising: (i) M current resonance multi-phase DC/DC converters which are connected in parallel with one another and each of which comprises N current resonance DC/DC converters including N resonance circuits sharing a resonance inductor and N switches, respectively, where M represents a first integer which is not less than two and N represents a second integer which is not less than two, said M current resonance multi-phase DC/DC converters producing M converter output voltages in response to an input voltage, and (ii) an output capacitor for combining said M converter output voltages to produce an output voltage, said method comprises:
   in each of said M current resonance multi-phase DC/DC converters:
      equating a switching frequency of a plurality of control signals for turning said N switches on/off, and
      shifting phases of said plurality of control signals to one another.

6. The method as claimed in claim 5, wherein each of said M current resonance multi-phase DC/DC converters comprises a step-down current resonance multi-phase DC/DC converter.

7. The method as claimed in claim 5, wherein each of said M current resonance multi-phase DC/DC converters comprises a step-up current resonance multi-phase DC/DC converter.

8. The method as claimed in claim 5, wherein each of said M current resonance multi-phase DC/DC converters comprises a polarity reversing current resonance multi-phase DC/DC converter.

9. A current resonance multi-phase DC/DC converting apparatus for generating an output voltage from an input voltage to supply said output voltage to a load, wherein said current resonance multi-phase DC/DC converting apparatus comprises:
   first through M-th current resonance multi-phase DC/DC converters for producing first through M-th converter output voltages in response to the input voltage where M represents a first integer which is not less than two;
   an output capacitor for combing the first through the M-th converter output voltages to produce said output voltage; and
   a control circuit for controlling driving of said first through said M-th current resonance multi-phase DC/DC converters on the basis of said output voltage,
   wherein an m-th current resonance multi-phase DC/DC converter where m represents a variable between one and the first integer M, both inclusive, comprises:
      first through N-th current resonance DC/DC converters, connected in parallel with one another, including first through N-th resonance capacitors and first through N-th switches, respectively, where N represents a second integer which is not less than two, said first through said N-th current resonance DC/DC converters producing first through N-th switched currents, respectively;
      a resonance inductor for collaborating the first through the N-th resonance capacitors to compose first through N-th resonance circuits, respectively; and
      a combining arrangement for combining the first through the N-th switched currents to produce an m-th converter output voltage.

10. The current resonance multi-phase DC/DC converting apparatus as claimed in claim 9, wherein each of said M current resonance multi-phase DC/DC converters comprises a step-down current resonance multi-phase DC/DC converter.

11. The current resonance multi-phase DC/DC converting apparatus as claimed in claim 9, wherein each of said M current resonance multi-phase DC/DC converters comprises a step-up current resonance multi-phase DC/DC converter.

12. The current resonance multi-phase DC/DC converting apparatus as claimed in claim 9, wherein each of said M current resonance multi-phase DC/DC converters comprises a polarity reversing current resonance multi-phase DC/DC converter.

13. The current resonance multi-phase DC/DC converting apparatus as claimed in claim 9, wherein said control circuit turns, in each of said first through said M-th current resonance multi-phase DC/DC converters, said first through said N-th switches on/off by using first through N-th control signals which have the same switching frequency and different phases.

14. The current resonance multi-phase DC/DC converting apparatus as claimed in claim 13, wherein said control circuit turns, in each of said first through said M-th current resonance multi-phase DC/DC converters, M n-th switches on/off by using M n-th control signals which have the same switching frequency and different phases, where n represents a variable between one and N, both inclusive.

* * * * *